US005521227A

United States Patent [19]

Palazzotto et al.

[11] Patent Number: 5,521,227
[45] Date of Patent: May 28, 1996

[54] ENERGY CURABLE CATIONCALLY AND FREE-RADICALLY POLYMERIZABLE PRESSURE-SENSITIVE COMPOSITIONS

[75] Inventors: Michael C. Palazzotto, St. Paul; Henry B. Clark, Roseville; George F. Vesley, Hudson; Jerry W. Williams, Cottage Grove; Patrick G. Zimmerman, St. Paul, all of Minn.

[73] Assignee: Minnesota Mining and Manufacturing Company, St. Paul, Minn.

[21] Appl. No.: 400,459

[22] Filed: Mar. 7, 1995

Related U.S. Application Data

[63] Continuation of Ser. No. 265,505, Jun. 24, 1994, abandoned, which is a continuation of Ser. No. 888,199, May 26, 1992, abandoned, which is a continuation of Ser. No. 512,921, Apr. 23, 1990, abandoned.

[51] Int. Cl.$^6$ ..................................................... C08F 2/46
[52] U.S. Cl. .................................. 522/4; 522/18; 522/170
[58] Field of Search ..................................... 522/170, 18, 4

[56] References Cited

U.S. PATENT DOCUMENTS

| | | | |
|---|---|---|---|
| 3,661,618 | 5/1972 | Brookman et al. | 117/62 |
| 3,690,937 | 9/1972 | Guse | 526/318 |
| 3,855,040 | 12/1974 | Malofsky | 156/310 |
| 4,038,454 | 7/1977 | Lehmann | 525/143 |
| 4,150,170 | 4/1979 | Lazear et al. | 427/54 |
| 4,156,035 | 5/1979 | Tsao et al. | 427/44 |
| 4,181,752 | 1/1980 | Martens et al. | 427/54.1 |
| 4,227,978 | 10/1980 | Barton | 204/159.12 |
| 4,330,590 | 5/1982 | Vesley | 428/336 |
| 4,379,201 | 4/1983 | Heilmann et al. | 428/345 |
| 4,391,687 | 7/1983 | Vesley | 204/159.16 |
| 4,428,807 | 1/1984 | Lee et al. | 204/159.14 |
| 4,446,246 | 5/1984 | McGinniss | 502/155 |
| 4,459,192 | 7/1984 | Via | 522/901 |
| 4,525,232 | 6/1985 | Rooney et al. | 156/273.3 |
| 4,525,553 | 6/1985 | Rooney et al. | 526/120 |
| 4,623,676 | 11/1986 | Kistner | 522/15 |
| 4,657,779 | 4/1987 | Gaske | 427/54.1 |
| 4,694,029 | 9/1987 | Land | 522/8 |
| 4,707,432 | 11/1987 | Gatechair | 430/281 |
| 4,717,605 | 1/1988 | Urban et al. | 428/1 |
| 4,751,138 | 8/1986 | Tumey et al. | |
| 4,849,320 | 7/1989 | Irving | 430/280 |
| 4,898,899 | 2/1990 | Isobe | 524/90 |
| 5,102,924 | 4/1992 | Williams et al. | 522/4 |

FOREIGN PATENT DOCUMENTS

| | | |
|---|---|---|
| 0096500 | 5/1983 | European Pat. Off. . |
| 0172330 | 6/1985 | European Pat. Off. . |
| 335629 | 3/1989 | European Pat. Off. . |
| 344910 | 4/1989 | European Pat. Off. . |
| 344911 | 4/1989 | European Pat. Off. . |
| 3844029A1 | 7/1989 | Germany . |
| 2110705A | 11/1982 | United Kingdom . |
| 88/02879 | 4/1988 | WIPO . |

*Primary Examiner*—Mark Chapman
*Attorney, Agent, or Firm*—Gary L. Griswold; Walter N. Kirn; Robert W. Sprague

[57] ABSTRACT

The present invention provides a pressure-sensitive adhesive composition and a method for producing the same. The pressure-sensitive adhesive composition is produced by the combination of at least one free-radically photopolymerizable monomer and at least one cationically polymerizable monomer and a suitable photoinitiation system consisting of at least one salt of a cationic organometallic complex, an optional additional free-radical initiator and the application of sufficient energy to photopolymerize same.

16 Claims, No Drawings

ENERGY CURABLE CATIONCALLY AND FREE-RADICALLY POLYMERIZABLE PRESSURE-SENSITIVE COMPOSITIONS

This is a continuation of application Ser. No. 08/265,505 Jun. 24, 1994 now abandoned, which is a continuation of application Ser. No. 07/888,199, filed May 26, 1992, now abandoned which is a continuation of application No. 07/512921 filed Apr. 23, 1990, now abandoned.

FIELD OF THE INVENTION

This invention relates to an energy-polymerizable pressure-sensitive adhesive composition comprising a free-radically polymerizable monomer in combination with a cationically polymerizable monomer, and as the photoinitiator system, an organometallic complex salt and optionally, an additional free-radical initiator, and a method for making same.

BACKGROUND OF THE INVENTION

Various polymeric coatings and articles are produced in processes involving use of organic solvents. Such processes require a latent catalyst or latent reaction promoter which can be activated in a controlled fashion. There is an intense effort by environmentalists, researchers, law makers, and industry to promote high solids and 100% solids formulations and processes to reduce or eliminate use of such solvents and attendant costs and environmental contamination.

Various patents, e.g., U.S. Pat. Nos. 4,150,170 (Lazear); 4,181,752 (Martens); 4,330,590 (Vesley); 4,379,201 (Heilmann); and 4,391,687 (Vesley) disclose pressure-sensitive adhesives made via ultraviolet irradiation of a composition consisting of free-radically polymerizable monomers and a free-radical photoinitiator. These patents do not disclose the use of more than one type of photopolymerizable monomer system, cationic organometallic photoinitiators, multiple wavelength irradiation or the use of epoxies in photopolymerizable pressure-sensitive adhesive compositions.

Radiation dual-curable compositions containing unsaturated monomers and epoxy monomers have been described in U.S. Pat. Nos. 4,156,035 (Tsao et al.), 4,227,978, (Barton), 4,428,807 (Lee et al.), 4,623,676 (Kistner), 4,657,779 (Gaske) and 4,694,029 (Land). These compositions include onium salts combined with organic compounds as the photoinitiators. A pressure-sensitive adhesive composition is not taught, nor the use of organometallic complex salts. Multi-wavelength irradiation is neither taught or suggested.

U.S. Pat. No. 4,717,605 (Urban et al.) teaches radiation curable adhesives which are based on the combination of an epoxide system and ionic photoinitiators of the triarylsulfonium complex type and at least one ethylenically unsaturated substance which can be polymerized by free-radicals and at least one free-radical photoinitiator. This patent teaches a hardenable glue, and no pressure-sensitive adhesives are disclosed. Also disclosed is the use of two light exposures. Use of organometallic complex salts is not disclosed.

U.S. Pat. No. 4,707,432 (Gatechair) teaches a free-radically polymerizable composition comprising a free-radically polymerizable material and a photoinitiator system comprising an alpha-cleavage or homolytic bond cleavage photoinitiator and a ferrocenium salt. The reference teaches that addition of epoxy, melamine, or vinyl ether containing prepolymers may allow cationic polymerization to ensue as well. Use of multiple wavelengths for photopolymerization is also disclosed. This reference does not teach adhesive compositions, nor that a pressure-sensitive adhesive having good cohesive strength improved pressure-sensitive adhesive properties may be made from an alkyl acrylate homopolymer and an epoxy, when polymerized in the presence of an organometallic complex cation salt.

WO 8802879 (Woods et al.) teaches a free-radically polymerizable composition comprising a free-radically polymerizable material and a photoinitiator system comprising a free-radical photoinitiator and a ferrocenium salt. The composition may contain one or more cationically polymerizable materials. No detail is provided as to the nature of these cationically polymerizable materials, nor do they teach the use of multiple wavelengths for irradiation. Pressure-sensitive adhesives with superior properties are not disclosed.

U.S. Pat. 4,849,320, (Irving) teaches an imaging system containing a combination of two different photoinitiators used with two different polymerizable monomers in combination with irradiation at two substantially different wavelengths. The monomers can be acrylate or epoxies or other cationically polymerizable monomers and the photoinitiators can include ferrocinium, onium salts or an alpha cleavage or homolyric bond cleavage photoinitiator. No pressure-sensitive adhesives are disclosed.

U.S. Pat. No. 4,752,138 (Tumey et al.) teaches a coated abrasive article prepared by polymerizing a combination of epoxy and acrylate monomers using a combination of photoinitiators which can be a ferrocinium, onium salts or an alpha-cleavage of homolytic bond cleavage photoinitiator. This patent does not disclose pressure-sensitive adhesives with superior properties cured via irradiation by multiple wavelengths.

E.P.O. 335629 (Rohm and Haas) discloses photoresists and printing plates comprising cationically polymerizable materials in combination with free-radically polymerizable materials, and photoinitiators for both materials. A multi-wavelength photopolymerization is also disclosed. No pressure-sensitive adhesives are disclosed.

U.S. Pat. No. 3,661,618 (Brookman et al.) concerns a process wherein a solvent-free coating primarily comprising an acrylic ester monomer, is polymerized to a tacky state by being subjected to a beam of high energy electrons. Use of photoinitiators, multiple wavelengths or epoxies is not disclosed.

E.P.O. 344,910, (Palazzotto et al.) discloses a photopolymerizable composition comprising a polymeric precursor, an optional photosensitizer and a two-component curing agent. The polymeric precursors are selected from ethylenically unsaturated monomers, epoxy and polyurethane monomers and mixtures thereof. The curing agent contains an organometallic salt and an onium salt. The compositions are generically disclosed to be useful as adhesives. No specific adhesive compositions or pressure-sensitive adhesives are disclosed.

E.P.O. 344,911 (DeVoe et al.) discloses a polymerizable composition comprising a polymeric precursor, a curing agent containing an organometallic salt and a solvent. The polymeric precursors are selected from ethylenically-unsaturated monomers alone, and in combination with either polyurethane precursors or epoxy monomers. The compositions are generically disclosed to be useful as adhesives. No specific adhesive compositions or pressure-sensitive adhesives are disclosed.

It is an object of the invention to provide a pressure-sensitive adhesive using a cationically polymerizable monomer in combination with a free-radically polymerizable monomer and a photoinitiator system containing at least one salt of a cationic organometallic complex.

It is a further object to provide an adhesive having good adhesive properties using preferred epoxy monomers in combination with preferred free-radically polymerizable monomers.

It is a further object of the invention to provide a pressure-sensitive adhesive having good adhesive properties using an acrylate homopolymer, i.e., without the necessity of the addition of polar copolymerizable monomers.

It is a further object of the invention to provide multiple photoinitiation processes which provide control over polymerization order, thereby providing increased control over properties of the desired composition.

It is a further object of the invention to provide a multiple, photoinitiation process for making a pressure-sensitive adhesive comprising at least one free-radically polymerized monomer, and one cationically polymerized monomer having superior adhesive properties to an identical adhesive otherwise polymerized.

SUMMARY OF THE INVENTION

This invention provides a pressure-sensitive adhesive composition, and a method for producing same. The pressure-sensitive adhesive composition comprises the combination of at least one free-radically photopolymerizable monomer and at least one cationically photopolymerizable monomer and a suitable photoinitiator system comprising at least one salt of a cationic organometallic complex. Preferred compositions also comprise at least one additional free-radical initiator.

The invention further encompasses a method for producing a pressure-sensitive adhesive by photopolymerizing the polymerizable compositions of the invention via the application of sufficient energy in the form of a combination of wavelengths of electromagnetic radiation such that photochemically reactive species initiate cationic and free-radical polymerization. Both photochemically active species may be derived from the cationic organometallic complex or, in preferred reactions a separate free-radical initiator initiates the free-radical reaction. Such irradiation may occur sequentially or simultaneously. The process requires no drying ovens to remove solvents and provides essentially no volatile matter.

The present invention also encompasses pressure-sensitive adhesive tapes comprising one or more pressure-sensitive adhesive layers, produced from such photopolymerizable compositions. Such tapes may be transfer tapes, or tapes comprising a backing layer.

Preferred pressure-sensitive adhesives of the invention comprise:

(a) at least one acrylic or methacrylic monomer, (b) at least one epoxy monomer, and (c) a salt of an organometallic complex cation.

Especially preferred pressure-sensitive adhesives of the invention comprise:

a) at least one alkyl acrylate ester, b) at least one epoxide monomer, c) at least one salt of a organometallic complex cation, and d) at least one free-radical photoinitiator.

The invention also provides a process for making such pressure-sensitive adhesives comprising the steps of:

(a) providing a backing or substrate, (b) coating the substrate with an energy polymerizable composition of at least one alkyl acrylate ester, at least one epoxy monomer, and a salt of an organometallic complex cation, by methods such as bar, knife, reverse roll, extrusion die, knurled roll, or spin coatings, or by spraying, brushing, and the like, with or without a coating solvent, and (c) irradiating the resultant article with electromagnetic radiation to cause the polymerization of the coating.

The invention also provides a preferred process for making such pressure-sensitive adhesives by multiple photoinitiators comprising the steps of:

(a) providing a backing or substrate, (b) coating an energy polymerizable composition of at least one alkyl acrylate ester, at least one epoxy monomer, and a salt of an organometallic complex cation and an additional free-radical photoinitiator on the substrate by methods such as bar, knife, reverse roll, extrusion die, knurled roll, or spin coatings, or by spraying, brushing, and the like, with or without a coating solvent, and (c) irradiating the resultant article to cause the polymerization of the coating utilizing a technique called the "multiple photoinitiation process,"

wherein the composition is sequentially or simultaneously irradiated with light sources which provide electromagnetic radiation which stimulates one or more photochemically reactive species to initiate both cationic and free-radical photopolymerization.

When used herein, the following terms have these definitions.

1. The term "multiple photoinitiation process" means photoinitiation of polymerization by irradiating a polymerizable mixture with electromagnetic radiation which stimulates photochemically reactive species (initiators) to initiate, respectively, cationic and free-radical photopolymerizations.

2. The term "energy-induced curing" means curing by means of electromagnetic radiation (ultraviolet and visible) accelerated particles (including electron beam), and thermal (infrared and heat) means or any combination thereof such as heat and light simultaneously, or in any sequence, e.g., heat followed by light, light followed by heat followed by light, and the like.

3. The term "free-radically polymerizable monomer" means at least one monomer that polymerizes by a free-radical mechanism; the monomer can be bireactive and includes acrylates and methacrylates, vinyl esters, vinyl aromatic compounds, etc.

4. The term "cationically polymerizable monomer" means at least one monomer that polymerizes by a cationic mechanism; the monomer can be biteactive and includes epoxies, vinyl ethers, N-vinyl compounds, etc.

5. The term "biteactive monomer" means at least one monomer that contains at least two free-radically or two cationically polymerizable groups and does not contain both types of groups simultaneously.

6. The term "bifunctional monomer" means those monomers which contain both at least one free-radically polymerizable group and at least one cationically polymerizable group.

7. The term "catalytically-effective amount" means a quantity sufficient to effect polymerization of the curable composition to a polymerized product at least to a degree to cause an increase in the viscosity of the composition under the conditions specified.

8. The term "organometallic salt" means an ionic salt of an organometallic complex cation, wherein the cation contains at least one carbon atom of an organic group which is bonded to a metal atom of the transition metal series ("Basic Inorganic Chemistry" F A Cotton, G. Wilkinson, Wiley, 1976, p 497).

9. The term "transition metal series" means those metals in the Periodic Table Groups IVB, VB, VIB, VIIB, AND VIII.

10. The term "photopolymerizable composition" as used herein means a mixture where the ratio of free-radically polymerizable monomer to cationically polymerizable monomer is 0.1:99.9 to 99.9:0.1.

11. The term "photoinitiator system" means a cationic organometallic complex photoinitiator or any combination of same with another photoinitiator, said system being capable of producing photochemically active species which will initiate both cationic and free-radical polymerizations.

DETAILED DISCLOSURE OF THE INVENTION

The present invention provides pressure-sensitive adhesives, produced from an energy polymerizable composition comprising at least one free-radically photopolymerizable monomer, at least one cationically polymerizable monomer, and a photoinitiator system therefor, the photoinitiator system comprising at least one organometallic complex salt. Preferred pressure sensitive adhesives also include at least one additional free-radical photoinitiator.

Free-radically polymerizable monomers can be selected from the acrylate, methacrylate and vinyl ester functionalized materials. Of particular use are acrylate and methacrylate materials. They can be monomers and/or oligomers such as (meth)acrylates (meth)acrylamides, vinyl pyrrolidone and azalactones. Such monomers include mono-, di-, or polyacrylates and methacrylates such as methyl acrylate, methyl methacrylate, ethyl acrylate, isopropyl methacrylate, isooctyl acrylate, isobornyl acrylate, isobornyl methacrylate, acrylic acid, n-hexyl acrylate, stearyl acrylate, allyl acrylate, glycerol diacrylate, glycerol triacrylate, ethylene glycol diacrylate, diethyleneglycol diacrylate, triethyleneglycol dimethacrylate, 1,6-hexanediol diacrylate, 1,3-propanediol diacrylate, 1,3-propanediol dimethacrylate, trimethanol triacrylate, 1,2,4-butanetriol trimethylacrylate, 1,4-cyclohexanediol diacrylate, pentaerythritol triacrylate, pentaerythritol tetraacrylate, pentaerythritol tetramethacrylate, sorbitol hexacrylate, bis[1-(2-acryloxy)]-p-ethoxyphenyl-dimethylmethane, bis[1-(3-acryloxy-2-hydroxy)]-propoxyphenyl dimethylmethane, tris-hydroxyethyl isocyanurate trimethacrylate; the bis-acrylates and bis-methacrylates of polyethylene glycols of molecular weight 200–500, copolymerizable mixtures of acrylated monomers such as those of U.S. Pat. No. 4,652,274, and acrylated oligomers such as those of U.S. Pat. No. 4,642,126.

Preferable free-radically photopolymerizable monomers include alkyl acrylate monomers, preferably a monofunctional unsaturated acrylate ester of a non-tertiary alkyl alcohol, the alkyl groups of which have from about 4 to about 14 carbon atoms. Such monomers include, e.g., isooctyl acrylate, 2-ethyl hexyl acrylate, isononyl acrylate, decyl acrylate, dodecyl acrylate, butyl acrylate, and hexyl acrylate. The alkyl acrylate monomers are preferably polymerized into homopolymers, or less preferably, may be polymerized in the presence of one or more polar copolymerizable monomers. When polar monomers are present, the acrylic polymers preferably contain up to about 5 parts, preferably up to 2 parts of the alkyl acrylate monomer per hundred parts photopolymerizable monomer mixture.

When used, polar copolymerizable monomers may be selected from strongly polar monomers such as acrylic acid, acrylamide, itaconic acid, hydroxyalkyl acrylates, or substituted acrylamides or moderately polar monomers such as N-vinyl-2-pyrrolidone, N-vinyl caprolactam, and acrylonitrile.

Compositions of the invention may contain ratios of free-radically polymerizable monomers to cationically polymerizable monomers of 99:1 to 1:99. Preferred compositions contain ratios of from about 40:60 to about 90:10. Highly preferred compositions contain ratios of from about 70:30 to about 80:20. At these highly preferred ratios, preferred pressure-sensitive adhesives of this invention exhibit superior cohesive and adhesive properties when compared to an acrylic homopolymer acrylate adhesive.

Cationically polymerizable monomers may be selected from epoxies, alkyl vinyl ethers, styrene, divinyl benzene, vinyl toluene and N-vinyl compounds.

Epoxy compounds that can be cured or polymerized by the processes of this invention, using a catalytically effective amount of the organometallic cation salt are those known to undergo cationic polymerization and include 1,2-, 1,3-, and 1,4-cyclic ethers (also designated as 1,2-, 1,3-, and 1,4-epoxides). The 1,2- cyclic ethers are preferred. Most preferred epoxies include 3,4-epoxycyclohexylmethyl-3,4-epoxycyclohexanecarboxylate, bis (3,4-epoxycyclohexyl) adipate, 2-(3,4-epoxycylclohexyl- 5,5-spiro-3,4-epoxy) cyclohexene-meta-dioxane, and 2,2-bis[p-(2,3-epoxypropoxy)phenyl]propane.

Cyclic ethers which can be polymerized in accordance with this invention include those described in "Ring-Opening Polymerizations, Vol 2", by Frisch and Reegan, Marcel Dekker, Inc. (1969). Suitable 1,2-cyclic ethers are the monomeric and polymeric types of epoxides. They can be aliphatic, cycloaliphatic, aromatic, or heterocyclic and will typically have an epoxy equivalence of from 1 to 6, preferably 1 to 3. Paticularly useful are the aliphatic, cycloaliphatic, and glycidylether type 1,2-epoxides such as propylene oxide, epichlorohydrin, styrene oxide, vinylcyclohexene oxide, vinylcyclohexene dioxide, glycidol, butadiene oxide, diglycidyl ether of bisphenol A, cyclohexeneoxide, 3,4-epoxycyclohexylmethyl- 3,4-epoxycyclohexanecarboxylate,3, 4-epoxy-6-methylcyclohexylmethyl- 3,4-epoxy-6-methylcyclohexanecarboxylate, bis(3,4-epoxy-6-methylcyclohexylmethyl) adipate, dicyclopentadiene dioxide, epoxidized polybutadiene, 1,4-butanediol diglycidyl ether, polyglycidyl ether of phenolformaldehyde resole or novolak resin, resorcinol diglycidyl ether, and epoxy silicones, e.g., dimethylsiloxanes having cycloaliphatic epoxide or glycidyl ether groups.

A wide variety of commercial epoxy resins are available and listed in "Handbook of Epoxy Resins" by Lee and Neville, McGraw Hill (1967) and in "Epoxy Resin Technology" by P. F. Bruins, John Wiley & Sons, (1968). Representative of the 1,3-and 1,4-cyclic ethers which can be polymerized in accordance with this invention are oxetane, 3,3-bis(chloromethyl)-oxetane, and tetrahydrofuran.

In particular, cyclic ethers which are readily available include propylene oxide, oxetane, epichlorohydrin, tetrahydrofuran, styrene oxide, cyclohexeneoxide, vinylcyclohexene oxide, glycidol, octylene oxide, phenyl glycidyl ether, 1,2-butane oxide, diglycidyl ether of bisphenol A (e.g., Epon™ 828 and "DER 331"), vinylcyclohexene dioxide (e.g., "ERL-4206"), 3,4-epoxycyclohexylmethyl-3,4-epoxy-cyclohexanecarboxylate (e.g., "ERL-4221"), 3,4-epoxy-6-methylcyclohexylmethyl- 3,4-epoxy-6-methylcyclohexanecarboxylate (e.g.,"ERL-4201"), bis(3,4-epoxy-cyclohexyl-methyl)adipate (e.g., "ERL-4299"), aliphatic epoxy modified with polypropylene glycol (e.g., "ERL-4050" and "ERL-4052"), dipentene dioxide (e.g., "ERL-4269"), epoxidized polybutadiene (e.g., "Oxiron™ 2001"), silicone epoxy (e.g., "Syl-Kem 90"), 1,4-butanediol diglycidyl ether (e.g., "Araldite RD-2") polyglycidyl ether of, phenolformaldehyde novolak (e. g., "DER-431", "Epi-Rex 521"and "DER-438"), resorcinol diglycidyl ether (e.g., "Kopoxite"), polyglycol diepoxide (e.g., "DER-736"), polyacrylate epoxide (e.g., "Epocryl U-14"), urethane modified epoxide (e. g., "QX3599"), polyfunctional flexible epoxides (e.g, "Flex ibilizer 151"), and mixtures thereof as well as mixtures thereof with co-curatives, curing agents or hardeners which also are well known (see Lee and Neville and Bruins, supra). Representative of the co-curatives which can be used are acid anhydrides such as nadic methyl anhydride, cyclopentanetetracarboxylic dianhydride, pyromellitic anhydride, cis-1,2-cyclohexaned icarboxylic anhydride, and mixtures thereof.

Another group of monomers which are useful in compositions of the invention are bifunctional monomers, i.e., those that possess at least one free-radically and one cationically reactive functionality. Such monomers include glycidyl acrylate, glycidyl methacrylate, hydroxyethyl acrylate, hydroxyethyl methacrylate, hydroxypropyl methylacrylate and hydroxybutyl acrylate.

The organometallic complex salt can have the structure:

$$[((L^1)(L^2)M)_b(L^3)(L^4)]^{+e}X_f \quad\quad I$$

wherein M represents a metal atom selected from the elements of Periodic Groups IVB, VB, VIB, VIIB, and VIII, with the proviso that formula I represents an organometallic salt having a mono- or bimetallic cation;

$L^1$ represents none, 1, 2, or 3 ligands contributing pi-electrons that can be the same or different ligand selected from substituted and unsubstituted acyclic and cyclic unsaturated compounds and groups and substituted and unsubstituted carbocyclic aromatic and heterocyclic aromatic compounds, each capable of contributing two to twelve pi-electrons to the valence shell of M;

$L^2$ represents none, or 1 to 6 ligands contributing an even number of sigma-electrons that can be the same or different selected from mono-, di-, and tri- dentate ligands, each donating 2, 4, or 6 sigma-electrons to the valence shell of M;

$L^3$ represents none, 1 or 2 bridging ligands contributing pi-electrons that can be the same or different ligand selected from substituted and unsubstituted acyclic and cyclic unsaturated compounds and groups and substituted and unsubstituted carbocyclic aromatic and heterocyclic aromatic compounds, each capable of acting as a bridging ligand contributing 4 to 24 pi-electrons to the valence shells of two metal atoms M, simultaneously;

$L^4$ represents none, 1, 2, or 3 bridging ligands contributing an even number of sigma-electrons that can be the same or different selected from mono-, di-, and tri-dentate ligands, each donating 2, 4 or 6 sigma-electrons to the valence shells of two metal atoms M, simultaneously; with the proviso that the total electronic charge contributed to M by the ligands $L^1, L^2, L^3$, and $L^4$ plus the product of the ionic charge on M with b results in a residual positive charge of e to the cation;

b is an integer having a value of 1 or 2;

e is an integer having a value of 1 or 2, the residual electrical charge of the cation;

X is an anion selected from organic sulfonate anions and halogen-containing complex anions of a metal or metalloid;

f is an integer having a value of 1 or 2, the number of anions required to neutralize the positive charge e on the cation.

In a preferred composition of the invention, the salts of the organometallic complex cation have the formula:

$$[(L^5)(L^6)M]^{+e}X_f \quad\quad II.$$

wherein

M represents a metal atom selected from elements of the Period Groups IVB, VB, VIB, VIIB, and VIII;

$L^5$ represents none, one or two ligands that can be the same or different, contributing pi-electrons selected from the same groups of ligands from which ligand $L^1$ of formula I is selected;

$L^6$ represents none or 1 to 6 ligands that can be the same or different, contributing an even number of sigma-electrons selected from the same group of ligands from which ligand $L^2$ of formula I is selected; with the proviso that the total electronic charge contributed to M by $L^5$ and $L^6$ plus the ionic charge on M results in a residual net positive charge of e to the complex; and e, f, and X have the same definition as given in formula I.

In highly preferred photoinitiator systems, $L^6$ represents no ligands and M is iron.

Ligands $L^1$ to $L^6$ are well known in the art of transition metal organometallic compounds.

Ligand $L^1$ and $L^3$ of general formula I and ligand, $L^5$ of general formula II are provided by any monomeric or polymeric compound having an accessible unsaturated group, i.e., an ethylenic, —C=C— group; acetylenic, —C≡C— group; or aromatic group which have accessible pi-electrons regardless of the total molecular weight of the compound. By "accessible" it is meant that the compound (or precursor compound from which the accessible compound is prepared) bearing the unsaturated group is soluble in a reaction medium, such as an alcohol, e.g., methanol; a ketone, e.g., methyl ethyl ketone; an ester, e.g., amyl acetate; a halocarbon, e.g., trichloroethylene; an alkylene, e.g., decalin; an aromatic hydrocarbon, e.g., anisole; an ether, e.g., tetrahydrofuran; etc. or that the compound is divisible into very fine particles of high surface area so that the unsaturated group (including aromatic group) is sufficiently close to a metal atom to form a pi-bond between that unsaturated group and the metal atom. By polymeric compound, is meant, as explained below, that the ligand can be a group on a polymeric chain.

Illustrative of ligands $L^1$, $L^3$ and $L^5$ are the linear and cyclic olefinic and acetylenic compounds having less than 100 carbon atoms, preferably having less than 60 carbon atoms, and from zero to 10 hetero atoms selected from nitrogen, sulfur, non-peroxidic oxygen, arsenic, phosphorus, selenium, boron, antimony, tellurium, silicon, germanium, and tin, such as, for example, ethylene, acetylene, propylene, methylacetylene, 1-butene, 2-butene, diacetylene, butadiene, 1,2-dimethylacetylene,cyclobutene, pentene, cyclopentene, hexene, cyclohexene, 1,3-cyclohexadiene, cyclopentadiene, 1,4-cyclohexadiene, cycloheptene, 1-octene, 4-octene, 3,4-dimethyl-3-hexene, and 1-decene; eta$^3$-allyl, eta$^3$-pentenyl, norbornadiene, eta$^5$-cyclohexadienyl, eta$^6$-cycloheptatriene, eta$^8$-cyclooctatetraene, and substituted and unsubstituted carbocyclic and heterocyclic aromatic ligands having up to 25 rings and up to 100 carbon atoms and up to 10 hetero atoms selected from nitrogen, sulfur, non-peroxidic oxygen, phosphorus, arsenic, selenium, boron, antimony, tellurium, silicon, germanium, and tin, such as, for example, eta$^5$-cyclopentadienyl, eta$^6$-benzene, eta$^6$-mesitylene, eta$^6$-toluene, eta$^6$-p-xylene, eta$^6$-o-xylene, eta$^6$-m-xylene, eta$^6$-cumene, eta$^6$-hexamethylbenzene, eta$^6$-fluorene, eta$^6$-naphthalene, eta$^6$- anthracene, eta$^6$- perylene, eta$^6$-chrysene, eta$^6$-pyrene, eta$^7$- cycloheptatrienyl, eta$^6$-triphenylmethane, eta$^{12}$-paracyclophane, eta$^{12}$-1,4-diphenylbutane, eta$^5$-pyrrole, eta$^5$-thiophene, eta$^5$-furan, eta$^6$-pyridine, eta$^6$-gamma- picoline, eta$^6$-quinaldine, eta$^6$-benzopyran, eta$^6$-thiochrome, eta$^6$-benzoxazine, eta$^6$-indole, eta$^6$-acridine, eta$^6$-carbazole, eta$^6$-triphenylene, eta$^6$-silabenzene, eta$^6$-arsabenzene, eta$^6$-stibabenzene, eta$^6$-2,4,6-triphenylphosphabenzene, eta$^5$-selenophene, eta$^6$- dibenzostannepine, eta$^5$-tellurophene, eta$^6$-phenothiarsine, eta$^6$-selenanthrene, eta$^6$-phenoxaphosphine, eta$^6$-phenarsazine, eta$^6$-phenatellurazine, and eta$^6$-1-phenylborabenzene. Other suitable aromatic compounds can be found by consulting any of many chemical handbooks.

As mentioned before, the ligand can be a unit of a polymer, for example, the phenyl group in polystyrene, poly(styrene-co-butadiene), poly(styrene-co-methyl methacrylate), poly(alpha-methylstyrene), polyvinylcarbazole, and polymethylphenylsiloxane; the cyclopentadiene group in poly(vinylcyclopentadiene); the pyridine group in poly(vinylpyridine), etc. Polymers having a weight average molecular weight up to 1,000,000 or more can be used. It is preferable that 5 to 50 percent of the unsaturated or aromatic groups present in the polymer be complexed with metallic cations.

Each of ligands $L^1$, $L^3$ and $L^5$ can be substituted by groups that do not interfere with complexing of the ligand with the metal atom or groups which do not reduce solubility of the ligand to the extent that complexing with the metal atom does not take place. Examples of substituting groups, all of which preferably have less than 30 carbon atoms and up to 10 hetero atoms selected from nitrogen, sulfur, non-peroxidic oxygen, phosphorus, arsenic, selenium, antimony, tellurium, silicon, germanium, tin, and boron, include hydrocarbyl groups such as methyl, ethyl, butyl, dodecyl, tetracosanyl, phenyl, benzyl, allyl, benzylidene, ethenyl, and ethynyl; hydrocarbyloxy groups such as methoxy, butoxy, and phenoxy; hydrocarbylmercapto groups such as methylmercapto (thiomethoxy), phenylmercapto (thiophenoxy); hydrocarbyloxycarbonyl such as methoxycarbonyl and phenoxycarbonyl; hydrocarbylcarbonyl such as formyl, acetyl, and benzoyl; hydrocarbylcarbonyloxy such as acetoxy, and cyclohexanecarbonyloxy; hydrocarbylcarbonamido, e.g., acetamido, benzamido; azo, boryl; halo, e.g., chloro, iodo, bromo, and fluoro; hydroxy; cyano; nitro; nitroso; oxo; dimethylamino; diphenylphosphino, diphenylarsino; diphenylstibine; trimethylgermane; tributyltin; methylseleno; ethyltelluro; and trimethylsiloxy; condensed rings such as benzo, cyclopenta; naphtho, indeno; and the like.

Ligands $L^2$ and $L^4$ in formula I, and $L^6$ in formula II are provided by monodentate and polydentate compounds preferably containing up to about 30 carbon atoms and up to 10 hetero atoms selected from nitrogen, sulfur, non peroxidic oxygen, phosphorus, arsenic, selenium, antimony, and tellurium, upon addition to the metal atom, following loss of zero, one, or two hydrogens, the polydentate compounds preferably forming with the metal, M, a 4-, 5-, or 6-membered saturated or unsaturated ring. Examples of suitable monodentate compounds or groups are carbon monoxide, carbon sulfide, carbon selenide, carbon telluride, alcohols such as ethanol, butanol, and phenol; nitrosonium (i.e., NO$^+$); compounds of Group VA elements such as ammonia, phosphine, trimethylamine, trimethylphosphine, triphenylamine, triphenylphosphine, tributylphosphite, isonitriles such as phenylisonitrile, butylisonitrile; carbene groups such as ethoxymethylcarbene, dithiomethoxycarbene; alkylidenes such as methylidene, ethylidene; suitable polydentate compounds or groups include 1,2-bis(diphenylphosphino)ethane, 1,2-bis(diphenylarsino)ethane, bis(diphenylphosphino)methane, ethylenediamine, propylenediamine, diethylenetriamine, 1,3-diisocyanopropane, and hydridotripyrrazolyborate; the hydroxycarboxylic acids such as glycolic acid, lactic acid, salicylic acid; polyhydric phenols such as catechol and 2,2'-dihydroxybiphenyl; hydroxyamines such as ethanolamine, propanolamine, and 2-aminophenol; dithiocarbamates such as diethyldithiocarbamate, dibenzyldithiocarbamate; xanthates such as ethyl xanthate, phenyl xanthate; the dithiolenes such as bis(perfluoromethyl)-1,2-dithiolene; aminocarboxylic acids such as alanine, glycine and o-aminobenzoic acid; dicarboxylic diamines as oxalamide, biuret; diketones such as 2,4-pentanedione; hydroxyketones such as 2-hydroxyacetophenone; alpha-hydroxyoximes such as salicylaldoxime; ketoximes such as benzil oxime; and glyoximes such as dimethylglyoxime. Other suitable groups are the inorganic groups such as, for example, CN$^-$, SCN$^-$, F$^-$, OH$^-$, Cl$^-$, Br$^-$, I$^-$, and H$^-$ and the organic groups such as, for example, acetoxy, formyloxy, benzoyloxy, etc. As mentioned before, the ligand can be a unit of a polymer, for example the amino group in poly(ethyleneamine); the phosphino group in poly(4-vinylphenyldiphenylphosphine); the carboxylic acid group in poly(acrylic acid); and the isonitrile group in poly(4-vinylphenylisonitrile).

M can be any element from the Periodic Groups IVB, VB, VIB, VIIB, and VIII, such as, for example, Ti, Zr, Hf, V, Nb, Ta, Cr, Mo, W, Mn, Tc, Re, Fe, Ru, Os, Co, Rh, Ir, Ni, Pd and Pt. In the preferred compositions, M is Co, Fe, Mn, Re, Mo or Cr. In the most preferred compositions, M is Fe.

Suitable anions, X, in formulas I and II, of use as the counterion in the ionic salts of the organometallic complex cation in the preferred radiation-sensitive compositions of the invention are those in which X has the formula DZ$_r$, wherein D is a metal from Groups IB to VIII or a metal or metalloid from Groups IIIA to VA of the Periodic Chart of Elements, Z is a halogen atom, a hydroxy group, a substituted phenyl group or an alkyl group and r is an integer having a value of 1 to 6. Preferably, the metals are copper, zinc, titanium, vanadium, chromium, manganese, iron, cobalt, or nickel and the metalloids preferably are boron, aluminum, antimony, tin, arsenic, and phosphorus. Preferably, the halogen, Z, of X in formula II, is chlorine or fluorine. Illustrative of suitable anions are B(phenyl)$_4^-$, B(phenyl)$_3$(alkyl)$^-$, where alkyl can be ethyl, propyl, butyl, hexyl and the like, BF$_4^-$, PF$_6^{31}$, AsF$_6^-$, SbF$_6^-$, FeCl$_4^-$, SnCl$_5^{31}$, SbF$_5^{31}$, AlF$_6^-$, GaCl$_4^-$, InF$_4^-$, TiF$_6^-$, ZrF$_6^-$, etc. Preferably, the anions are BF$_4^-$, PF$_6^-$, SbF$_6^-$, SbF$_5$_OH$^-$, AsF$_6^-$, and SbCl$_6^-$.

Additional suitable anions, X, in formulae I and II, of use as the counterion in the ionic salts of the organometallic complex cations include those in which X is an organic sulfonate. Illustrative of suitable sulfonate-containing anions are CH$_3$SO$_3^-$, CF$_3$SO$_3^-$ C$_6$H$_5$SO$_3^-$, p-toluenesulfonate, p-chlorobenzenesulfonate and related isomers and the like.

Organometallic salts are known in the art and can be prepared as disclosed in, for example, EPO Nos. 9,851, 094,914,094,915 and 126,712, which are incorporated herein by reference. In addition to the compounds of formulae I and II, all of the organometallic salts disclosed in these references are useful in the present invention.

The preferred salts of organometallic complex cations useful in the compositions of the invention are derived from formula II where $L^5$ is taken from the class of substituted and unsubstituted aromatic compounds based on a benzene or cyclopentadienyl nucleus, is none, M is $L^6$ Fe, e is 1 or 2 and $X_f$ is tetrafluoroborate, hexafluorophosphate, hexafluoroarsenate or hexafluoroantimonate.

Examples of preferred salts of organometallic complex cations useful in the composition of the invention include the following:

(eta⁶-benzene)(eta⁵-cyclopentadienyl)iron(1+) hexafluoroantimonate (eta⁶-toluene)(eta⁵-cyclopentadienyl)iron(1+) hexafluoroantimonate (eta⁶-cumene)(eta⁵-cyclopentadienyl)iron(1+) hexafluoroantimonate (eta⁶-p-xylene)(eta⁵-cyclopentadienyl)iron(1+) hexafluoroantimonate (eta⁶-o-xylene) (eta⁵-cyclopentadienyl)iron(1+) hexafluoroantimonate (eta⁶-m-xylene)(eta⁵-cyclopentadienyl)iron(1+) hexafluoroantimonate (eta⁶-mesitylene)(eta⁵-cyclopentadienyl)iron(1+) hexafluoroantimonate (eta⁶-hexamethylbenzene)(eta⁵-cyclopentadienyl)iron(1+) hexafluoroantimonate (eta⁶-naphthalene)(eta⁵-cyclopentadienyl)iron(1+) hexafluoroantimonate (eta⁶-pyrene)(eta⁵-cyclopentadienyl)iron(1+) hexafluoroantimonate (eta⁶-perylene)(eta⁵-cyclopentadienyl)iron(1+) hexafluoroantimonate (eta⁶-chrysene)(eta⁵-cyclopentadienyl)iron(1+) hexafluoroantimonate (eta⁶-acetophenone)(eta⁵-methylcyclopentadienyl)iron(1+) hexafluoroantimonate (eta⁶-fluorene)(eta⁵-cyclopentadienyl)iron(1+) hexafluoroantimonate bis(eta⁶-mesitylene)iron(2+) hexafluoroantimonate.

It is believed that the cationic organometallic complex salts form photochemically reactive species capable of initiating both cationic and free-radical polymerizations. Thus, the photoinitiator system may comprise only a single organometallic complex cation salt. However, preferred compositions of the inventions have photoinitiat or systems containing an optional additional free-radical initiator.

The optional additional free-radical initiator can be selected from those compounds that generate free-radicals upon exposure to heat or radiation, e.g., those compounds disclosed in "Mechanisms of the Photodecomposition of Initiators" George F. Vesley, *Journal of Radiation Curing*™, January, 1986, incorporated herein by reference. They are selected from acetophenones and ketals, benzophenones, aryl glyoxalates, acylphosphine oxides, sulfonium and iodonium salts, diazonium salts and peroxides. Preferred additional free-radical initiators that are light activated are those that have an absorption maximum in the 300 to 400 nm region of the electromagnetic spectrum.

Especially useful are acetophenones and ketals corresponding to the formula:

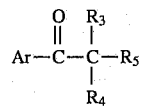

wherein Ar is $C_6$–$C_{14}$ aryl which is unsubstituted or substituted by halogen, CN, OH, $C_1$–$C_{12}$ alkyl,-alkoxy, -phenoxy, -thioalkyl, —$SCH_2$ $CH_2OH$, -thiophenyl, —$SO_2$ alkyl, —$SO_2$phenyl, —COOalkyl, —$SO_2NH_2$, $SO_2N$—Halkyl, —$SO_2N(alkyl)_2$, —NHalkyl, —N(alkyl)$_2$, —NHCOalkyl or —NHCO-phenyl, or represents thienyl, pyridyl, furyl, indanyl or tetrahydronaphthyl, and alkyl represents a lower alkyl radical of 1 to 4 carbon atoms;

$R_3$ is OH, $C_1$–$C_8$ alkyl which is unsubstituted or substituted by —OH, alkoxy, $C_2$–$C_8$ acyloxy, —COOalkyl or CN, or is $C_3$–$C_4$ alkylenyl, $C_5$–$C_6$ acycloalkyl, $C_7$–$C_9$ phenylalkyl, or —$OR_6$ wherein $R_6$ is $C_1$–$C_8$ alkyl which is unsubstituted or substituted by —OH, alkoxy, $C_2$–$C_8$ acyloxy, —COOalkyl, —CN or phenyl, or $C_6$aryl; and $R_5$ has one of the meanings assigned to $R_3$, $C_2$–$C_8$ alkylenylene or together with $R_3$ represents $C_2$–$C_8$ alkylene or $C_3$–$C_9$ oxaalkylene or azaalkylene; and $R_5$ is hydrogen, OH, $C_1$–$C_8$ alkyl, $C_6$–$C_{14}$ aryl, $C_5$–$C_8$ cycloalkyl or morpholino.

Such compounds have been disclosed, for example, in U.S. Pat. Nos. 3,715,293, 3,728,377, 4,284,485 and 4,318, 791, all of which are incorporated herein by reference.

Preferred compounds have $R_3$ and $R_4$ as —$OR_6$, $R_6$ as $C_1$–$C_4$ alkyl and $R_5$ phenyl; or $R_3$ and $R_4$ combining to form $C_2$–$C_8$ alkylene, preferably cyclohexylene, and $R_5$ as —OH or phenyl.

Typical alkyl groups include methyl, ethyl, propyl, isobutyl, t-butyl, pentyl, neopentyl, hexyl, heptyl, octyl, 2-ethylhexyl; aryl groups include phenyl, naphthyl, anthracyl, tolyl, xylyl, methoxyphenyl, halophenyl, hydroxyphenyl, nitrophenyl and carboethoxyphenyl; and cycloalkyl groups include cyclopentyl, methylcyclopentyl, dimethylcyclopentyl, ethylcyclopentyl, cyclohexyl, methylcyclohexyl, cycloheptyl, bicycloheptyl, cyclooctyl, and bicyclooctyl.

Illustrative thereof are
2,2-dimethoxyacetophenone
2,2-dimethoxy-2-phenylacetophenone
2,2-diethoxyacetophenone
2,2-dibutoxyacetophenone
2,2-dihexoxyacetophenone
2,2-di(2-ethylhexoxy)acetophenone
2,2-diphenoxyacetophenone
2,2-ditolyloxyacetophenone
2,2-di(chlorophenyl)acetophenone
2,2-di(nitrophenyl)acetophenone
2,2-diphenoxy-2-phenylacetophenone
2,2-dimethoxy-2-methylacetophenone
2,2-dipropoxy-2-hexylacetophenone
2,2-diphenoxy-2-ethylacetophenone
2,2-dimethoxy-2-cyclopentylacetophenone
2,2-di(2-ethylhexyl)-2-cyclopentylacetophenone
2,2-diphenoxy-2-cyclopentyl-acetophenone
2,2-di(nitrophenoxy)-2-cyclohexylacetophenone
2,2-dimethyl-2-hydroxyacetophenone
2,2-diethoxy-2- phenylacetophenone
2,2-diphenethyl oxy-2-phenylacetophenone
2,2-(2-butenediyloxy)-2phenylacetophenone
2,2-dimethyl-2-morpholino-(p-thiomethyl) acetophenone
1-hydroxycyclohexyl phenyl ketone.

Also preferred are aromatic onium salts. These salts are disclosed, for example in U.S. Pat. Nos. 4,069,054, 4,231, 951 and 4,250,203. Such salts are described by the formula wherein A is an organic cation selected from those described in U.S. Pat. Nos. 3,708,296, 3,729,313, 3,741,769, 3,794,576, 3,808,006, 4,026,705, 4,058,401, 4,069,055, 4,101,513, 4,216,288, 4,394,403, and 4,623,676, all incorporated herein by reference, preferably selected from diazonium, iodonium, and sulfonium cations, more preferably A is selected from diphenyliodonium, triphenylsulfonium and phenylthiophenyl diphenylsulfonium;, and X is an anion where X is the same as defined for formulas I and II. Preferably, the anions are $CF_3SO_3^-$, $BF_4^-$, $PF_6^-$, $SbF_6^-$, $SbF5OH^-$, $AsF_6^-$, and $SbCl_6^-$.

Photoinitiators which are useful for partially polymerizing alkyl acrylate monomer without crosslinking, to prepare the partially polymerized syrup, discussed infra at page 30, include the benzoin ethers (such as benzoin methyl ether or benzoin isopropyl ether), substituted benzoin ethers (such as anisoin methyl ether), substituted acetophenones (such as 2,2-diethoxyacetophenone and 2,2-dimethoxy-2-phenylacetophenone), substituted alpha-ketols (such as 2-methyl-2-hydroxypropiophenone), aromatic sulfonyl chlorides (such as 2-naphthalenesulfonyl chloride) and photoactive oximes [such as 1-phenyl-1,1-propanedione-2(O-ethoxycarbonyl)oxime]. Photoinitiators may be used for syrup-making in amounts which, when dissolved, provide about 0.001 to 0.5 percent by weight of the alkyl acrylate monomer, preferably at least 0.01 percent.

Where concurrent crosslinking is desirable, the specific photoactive chromophore-substituted-halomethyl-s-triazines disclosed in U.S. Pat. Nos. 4,391,687 (Vesley) and 4,330,590, (Vesley) and 4,329,384 (Vesley et al.) are also useful as photoinitiators. The preferred level of triazine taught ranges from 0.01 to about 2 parts of the crosslinking agent per 100 parts acrylic copolymer.

A suitable photoinitiator system which includes organometallic complex ionic salts described by formulae I or II, and preferably the additional free-radical initiator contains those combinations that, upon application of sufficient energy, thermal, accelerated particle (electron beam), or electromagnetic radiation (having a wavelength from about 200 to 800 nm), will catalyze the polymerization of the compositions of the invention. The level of catalytic activity depends on various factors such as the choice of metal, ligands, and counterions in the organometallic salt and the selection of the additional free-radical photoinitiator, if any.

In general, the photoinitiator system should be present in a catalytically effective amount. Typically, the photoinitiator system can be present in the range of 0.01 to 20, preferably 0.1 to 10 weight percent of the total polymerizable composition. The ratio of the organometallic complex salt to the additional free-radical initiator, if present, is generally in the range of 1 to 100 to 100 to 1. Preferably, the ratio is in the range of 1 to 10 and 10 to 1.

Energy polymerizable compositions of this invention are radiation-sensitive in addition to being thermally sensitive, i.e., they can be polymerized in a two stage polymerization process using radiation followed by heat. Heat can also be applied before or during the irradiation process to promote or retard polymerization of the composition.

When desired, photosensitizers or photoaccelerators may be incorporated into the photopolymerizable compositions, use of photosensitizers or photoaccelerators alters the wavelength sensitivity of radiation-sensitive compositions employing the latent catalysts of this invention. This is particularly advantageous when the latent catalyst does not strongly absorb the incident radiation. Use of a photosensitizer or photoaccelerator increases the radiation sensitivity, allowing shorter exposure times and/or use of less powerful sources of radiation. Any photosensitizer or photoaccelerator may be useful if its triplet energy is at least 45 kilocalories per mole. Examples of such photosensitizers are given in Table 2-1 of Steven L. Murov, "Handbook of Photochemistry," Marcel Dekker Inc., 27–35 (1973), and include pyrene, fluoranthrene, xanthone, thioxanthone, benzophenone, acetophenone, benzil, benzoin and ethers of benzoin, chrysene, p-terphenyl, acenaphthene, naphthalene, phenanthrene, biphenyl, substituted derivatives of the preceding compounds, and the like, when present, the amount of photosensitizer or photoaccelerator used in the practice of the present invention is generally in the range of 0.01 to 10 parts, and preferably 0.1 to 1.0 part, by weight, of photosensitizer or photoaccelerator per part of organometallic salt.

Long wavelength sensitizers may be added, i.e., dyes. Suitable sensitizers are believed to include compounds in the following categories of dyes: ketones, aminoketones, coumarin (e.g. ketocoumarins), xanthenes, acridines, thiazoles, thiazines, oxazines, azines, porphyrins, aromatic polycyclic hydrocarbons, aminotriaryl methanes, merocyanines, squarylium and pyridinium.

While not being bound by theory, it is believed that the compositions comprising preferred ratios of free-radically polymerizable monomer, cationically polymerizable monomer, and photoinitiator system allows the incorporation of cationically polymerizable material as a separate phase. This provides internal strength even where a polar comonomer such as acrylic acid, itaconic acid or acrylamide is not used. Additionally, this invention provides a means to provide high strength without sacrificing the properties of elongation and peel strength which are important to adhesive performance.

Pressure-sensitive adhesives of the invention may be foam-like adhesives, i.e., a monomer blend comprising microspheres may be used. The microspheres may be glass or polymeric. The microspheres should have an average diameter of 10 to 200 micrometers, and comprise from about 5 to about 65 volume percent of the core layer. Thickness of foam-like layers in preferred tapes of the invention range from 0.3 mm to about 4.0 mm in thickness.

Preferred glass microspheres have average diameters of about 80 micrometers. When glass microspheres are used, the removable pressure-sensitive adhesive layer should be at least 3 times as thick as their diameter, preferably at least 7 times. Thickness of layers containing such glass microspheres should be at least six times, preferably at least twenty times that of each microsphere-free layer.

Useful glass microspheres include colored microspheres such as those disclosed in U.S. Pat. Nos. 4,612,242, (Vesley et al.), 4,618,242, (Chamberlain et al.) and 4,666,771, (Vesley et al.), all of which are incorporated herein by reference.

Also useful are polymeric microspheres, such as those described in U.S. Pat. Nos. 4,855,170 (Darvell et al.), 3,615,972 (Moon), 4,075,238 (Mark), and 4,287,308 (Nakayama), all of which are incorporated herein by reference. The microspheres are available from Kema Nord Plastics under the trade name "Expancel" and from Matsumoto yushi Seiyaku under the trade name "Micropearl". In expanded form, the microspheres have a specific density of approximately 0.02–0.036 g/cc.

Other useful materials which can be blended into the compositions of the invention include, but are not limited to, fillers, pigments, fibers, woven and nonwoven fabrics, foaming agents, antioxidants, stabilizers, fire retardants, free-radical inhibitors, and viscosity adjusting agents.

An especially useful filler material is hydrophobic silica as disclosed in U.S. Pat. Nos. 4,710,536 and 4,749,590, (Klingen et al.) both of which are, incorporated herein by reference. In one preferred embodiment of the present invention, the sensitive adhesive composition further comprises from about 2 to about 15 parts of a hydrophobic silica having a surface area of at least 10 m$^2$/g.

It is also within the scope of this invention to add mono or polyfunctional alcohols to the polymerizable composition. Such alcohols can be selected from methanol, ethanol, 1-propanol, 2-propanol, 1-butanol, 1-pentanol, 1-hexanol, 1-heptanol, 1-octanol, pentaerythritol, 1,2-propanediol, ethylene glycol, and glycerol.

Preferably, compounds containing hydroxyl groups, particularly compounds containing from about 2 to 50 hydroxyl groups and above all, compounds having a weight average molecular weight of from about 500 to 25000, preferably from about 700 to 2000, for example, polyesters, polyethers, polythioethers, polyacetals, polycarbonates, poly-(meth)acrylates, and polyester amides, containing at least 2, generally from about 2 to 8, but preferably from about 2 to 4 hydroxyl groups, or even hydroxyl-containing prepolymers of these compounds. Representatives of the above-mentioned compounds used in accordance with the present invention are described, for example, in High Polymers, Vol. XVI, "Polyurethanes, Chemistry and Technology", By Saunders and Frisch, Interscience, and Vol. I, 1962, pages 32 to 42 and pages 44 to 54 and Vol. II, 1964, pages 56 and 198–199, add in "Kunststoff-Handbuch", Vol. VII, Vieweg-Hochtlen, Carl-HanserVerlag, 1966, for example, on pages 45 to 71. It is, of course, possible to use mixtures of the above-mentioned compounds containing at least two hydroxyl groups and having a molecular weight of from about 50 to 50,000 for example, mixtures of polyethers and polyesters. In some cases, it is particularly advantageous to combine low-melting and high-melting polyhydroxyl containing compounds with one another (German Offenlegungsschrift No. 2,706,297).

Low molecular weight compounds containing at least two reactive hydroxyl groups(molecular weight from about 50 to 400) suitable for use in accordance the present invention are compounds preferably containing hydroxyl groups and generally containing from about 2 to 8, preferably from about 2 to 4 reactive hydroxyl groups. It is also possible to use mixtures of different compounds containing at least two hydroxyl groups and having a molecular weight in the range of from about 50 to 400. Examples of such compounds are ethylene glycol, 1,2- and 1,3-propylene glycol, 1,4- and 2,3-butylene glycol, 1,5-pentane diol, 1,6-hexane diol, 1,8-octane diol, neopentyl glycol, 1,4-bis hydroxymethyl cyclohexane, 2-methyl-1,3-propane diol, dibromobutene diol, glycerol, trimethylolpropane, 1,2,6-hexanetriol, trimethylolethane, pentaerythritol, quinitol, mannitol, sorbitol, diethylene glycol, triethylene glycol, tetraethylene glycol, higher polyethylene glycols, dipropylene glycol, higher polypropylene glycols, dibutylene glycol, higher polybutylene glycols, 4,4'-dihydroxy diphenyl propane and dihydroxy methyl hydroquinone.

Other polyols suitable for the purposes of the present invention are the mixtures of hydroxy aldehydes and hydroxy ketones ("formose") or the polyhydric alcohols obtained therefrom by reduction ("formitol") which are formed in the autocondensation of formaldehyde, polymers thereof and hydrates thereof, in the presence of metal compounds as catalysts and compounds capable of enediol formation as co-catalysts (German Offenlegungsschrift Nos. 2,639,084; 2,714,084; 2,714,104; 2,721,186; 2,738,154; and 2,738,512).

Polyfunctional alcohols such as Carbowaxes™ poly(ethylene glycol) poly(ethylene glycol methyl ether), poly(ethylene glycol tetrahydrofurfuryl ether, poly(propylene glycol).

The present invention also provides a process for preparing pressure-Sensitive adhesives comprising the steps of:

(a) providing a backing or substrate, (b) coating an energy polymerizable mixture as described above to the substrate by methods known in the art, such as bar, knife, reverse roll, knurled roll, or spin coatings, or by spraying, brushing, and the like, with or without a coating solvent, and (c) irradiating the resultant article to cause polymerization of the coating utilizing a technique called the "multiple photoinitiation process," wherein the mixture is sequentially or simultaneously irradiated with light sources which provide electromagnetic radiation which stimulates photochemically reactive species to initiate both cationic and free-radical photopolymerization.

It is not preferred, but it may be desirable in certain applications to add solvent to solubilize components and aid in processing. Solvent, preferably an organic solvent, in an amount up to 99 weight percent, but preferable in the range of 0 to 90 weight percent, most preferable in the range of 0 to 75 weight percent, of the polymerizable composition can be used.

The process for polymerization of the composition may be completed in one step, or may be divided into several steps, where such is preferable.

Where divided, the steps are preferably arranged in the following order. The first step is to mix the free-radically photopolymerizable monomer(s) with an effective amount of a free-radical initiator. Any bireactive monomers desired should be added in the fourth step, described, infra. Preferably, this free-radical initiator does not also function as a crosslinking agent.

The second step is to irradiate the composition, and allow it to polymerize so that the viscosity increased. This will provide a partially polymerized syrup typically having a Brookfield™ viscosity of 300 to 20,000 centipoise at room temperature, preferably, from 500 to 2000 centipoise. The increased viscosity provides a syrup that is a more suitable coating composition for the production of pressure-sensitive adhesives. If a photoinitiator is used for this process, the partial polymerization may be stopped at any point simply by turning off the irradiation source. Alternatively, the syrup can be prepared by conventional thermal polymerization techniques and then quenched with air to attain the desired viscosity. Alternatively, the organometallic photoinitiator may be mixed with an alkyl acrylate monomer and then partially polymerized to form a syrup. The syrup can also be mixed with a viscosity adjusting agent, such as a hydrophilic silica to obtain a suitable viscosity for coating.

The third step is to mix the cationically photopolymerizable monomer with an effective amount of an organometallic complex salt. Generally the amount of organometallic complex salt is in the range of 0.01 to 10%, more preferably in the range of about 0.1% to about 5% of the cationically polymerizable monomer.

The fourth step is to mix said syrup with said epoxy/ organometallic photoinitiator solution and an additional amount of the above-identified free-radical initiator. The modified syrup may be coated onto a backing and exposed to energy to complete the polymerization.

Suitable backings for the adhesives include paper, plastic films, vinyl (e.g. polyethylene and polypropylene, polyethylene terephthalate) and the like, metals, cloth and cellulose acetate. The backings may be release coated with, e.g. silicone or fluorochemical coatings. The composition may be either permanently or releasably bonded to the backing.

Alternatively, the composition may be made by mixing all photopolymerizable monomers with an effective amount of a free-radical initiator, partially polymerizing to increase viscosity, then adding the organometallic complex salt and following up by irradiation.

Temperature of polymerization and amount of catalyst will vary depending on the particular photopolymerizable composition used and the desired application of the polymerized product. The amount of the total photoinitiator system to be used in this invention should be a catalytically-effective amount under the desired use conditions. As previously stated, such amount generally will be in the range of about 0.01 to 20 weight percent, and preferably 0.1 to 10.0 weight percent, based on the weight of curable composition.

Solvents, preferably organic, can be used to assist in dissolution of the photoinitiator system in the free-radically and cationically polymerizable monomers, and as a processing aid. It may be advantageous to prepare a concentrated solution of the organometallic complex salt in a solvent to simplify the preparation of the photopolymerizable composition. Representative solvents include propylene carbonate, acetone, methyl ethyl ketone, cyclopentanone, methyl cellosolve acetate, methylene chloride, nitromethane, methyl formate, acetonitrile, gamma-butyrolactone, and 1,2-dimethoxyethane (glyme). In some applications, it may be advantageous to adsorb the photoinitiator onto an inert support such as silica, alumina, clays, etc., as described in U.S. Pat. No. 4,677,137 (Bany), incorporated herein by reference.

Compositions containing an organometallic complex salt of Formula I and, in some cases, a free-radical photoinitiator may be photopolymerized by exposure to any source of radiation, including electron beam radiation and radiation sources emitting active radiation in the ultraviolet and visible region of the spectrum (e.g., about 200 to 800 nm). Suitable sources of radiation include mercury vapor discharge lamps, carbon arcs, tungsten lamps, xenon lamps, lasers, sunlight, and the like. The required amount of exposure to effect polymerization is dependent upon such factors as the identity and concentrations of the organometallic complex salt and free-radical photoinitiator, if any; the specific free-radically and cationically polymerizable monomers, thickness of the exposed material, intensity of the radiation source and amount of heat associated with the radiation.

For the multiple photoinitiation process, light of various wavelengths is preferably used. Although a single cationic organometallic salt may be used to initiate both cationic and free-radical photopolymerizations, it is preferable to initiate each reaction with a separate initiator. These photoinitiators frequently have absorption maxima at differing wavelengths. In such case, use of light having substantially different wavelengths will generally be required. This increased control over the order of polymerization provides a consonant increase in the ability to control the final properties of the composition. Such light can be provided in a number of ways. Different light sources of substantially different wavelengths can be used. The wavelengths of major intensity for each light source can be obtained from examination of the spectral output of each source. One light source could be used for different wavelength regions through use of filters or monochromators. Lasers or other monochromatic light sources are also useful. For example, a tungsten lamp, whose output is mainly in the visible region, could be used as one light source while a lamp whose output is concentrated around 360 nm, e.g. a black light, could be used as another source.

Thermal polymerization using direct heating or infrared electromagnetic radiation, as it is known in the art, can be used to polymerize the free-radically and cationically polymerizable monomers according to the teachings of this invention. It is also possible to use microwave irradiation to provide energy to polymerize the compositions of this invention.

It is within the scope of this invention to use multiple wavelengths by irradiating the photopolymerizable compositions either sequentially or simultaneously. In the preferred method, photopolymerization is effected by sequential exposure to a radiation source emitting active radiation in the visible region of the spectrum, followed by exposure to a radiation source in the ultraviolet region of the spectrum. It is also preferred to heat either during or after the irradiation in the visible region. In addition, it may be desirable to subsequently thermally polymerize the activated precursor so obtained, the irradiation temperatures being below the temperature employed for subsequent heat postcuring. These activated precursors may normally be polymerized at temperatures which are substantially lower than those required for direct thermal polymerization, with an advantage in the range from 50° C. to 110° C. This process also makes it possible to control polymerization in a particularly simple and advantageous manner.

In the current state of the art, photopolymerization is carried out in an inert atmosphere. Any inert atmosphere such as nitrogen, carbon dioxide, helium or argon is suitable. A sufficiently inert atmosphere can be achieved by covering a layer of the photoactive mixture with a plastic film which is transparent to ultraviolet radiation and irradiating through that film in air. The composition should be kept in low light, or preferably total darkness, until ready for photopolymerization.

Adhesive tapes comprising adhesive layers of the invention may further comprise additional layers of similar or different adhesives. Where multilayer tape constructions are desirable, a preferred method of construction is multilayer coating, as described in U.S. Pat. Nos. 4,818,610 (Zimmerman et al.), 4,894,259 (Kuller) and 4,895,738 (Zimmerman et al.) all of which are incorporated herein by reference, wherein a plurality of copolymerizable coatable compositions is prepared, each composition containing at least one photopolymerizable monomer. One of the coatable compositions is the novel pressure-sensitive adhesive of the invention. The coatable compositions are coated to provide a plurality of, superimposed layers with contiguous layers defining an interface therebetween, with the novel pressure-sensitive adhesive of the invention being coated as a first or last layer. Migration of photopolymerizable monomers through the interface between contiguous layers is permitted, and the superimposed layers are then simultaneously irradiated. This provides polymeric chains comprised of copolymers of free-radical photopolymerizable monomers originating from contiguous layers extending through the interface therebetween, thereby producing a tape having layers which cannot be delaminated.

Objects and advantages of this invention are further illustrated by the following examples, but they should not be construed as limiting the invention; the scope of which is defined by the claims.

In the examples, all parts, ratios, and percent are by weight unless specifically indicated otherwise. All examples were prepared in ambient atmosphere (presence of oxygen and water) unless indicated otherwise.

Test Methods

Tensile Strength and Percent Elongation

Tensile strength and percent elongation of viscoelastic pressure-sensitive adhesive layers were determined using an Instron™ model 1122 tensile testing apparatus. The crosshead speed was 508 millimeters per minute. Samples were cut from the adhesives prepared using the coating procedure described below using an American Society of Test Methods test "ASTM D 638" Type IV die. Average thickness of the testing sample was 1.0 mm.

Peel Adhesive Strength

Peel strength adhesion to steel or glass was measured by applying a 1.25 cm.×15 cm. strip of adhesive to a 5 cm.×15 cm. stainless steel or glass panel, attaching a 1.25 cm.×15 cm. strip of 200 micrometer thick aluminum foil to the opposite side of the adhesive layer to provide rigidity, letting the sample dwell for three days, and measuring the force required to remove the adhesive/aluminum foil composite from the panel at an angle of 90 degrees, using an Instron™ model 1122 tensile testing apparatus. The force is recorded in Newtons/millimeter.

GLOSSARY

FREE-RADICAL PHOTOINITIATORS

| | |
|---|---|
| F-1 | 2,2-dimethoxy-2-phenyl acetophenone, |
| F-2 | 1-hydroxycyclohexyl phenyl ketone, |
| F-3 | 2-methyl-1-[4-(methylthio)phenyl]-2-morpholinopropanone-1 |

ORGANOMETALLIC COMPLEX SALTS

| | |
|---|---|
| O-1 | (eta$^6$-mesitylene)(eta$^5$-cyclopentadienyl)iron(1+) hexafluoroantimonate |
| O-2 | bis(eta$^6$-tetralin)iron(2+) hexafluoroantimonate |
| O-3 | (eta$^6$-mesitylene)(eta$^5$-cyclopentadienyl)iron(1+) hexafluoroarsenate |
| O-4 | bis(eta$^6$-mesitylene)iron(2+) hexafluoroarsenate |
| O-5 | bis(eta$^6$-mesitylene)iron(2+) hexafluoro antimonate |
| O-6 | (eta$^5$-cyclopentadienyl)dicarbonyltriphenyl phosphine iron(1+) hexafluoroantimonate |
| O-7 | (eta$^5$-cyclopentadienyl)dicarbonyltriphenyl stibine iron(1+) hexafluoroantimonate |
| O-8 | (eta$^6$-naphthalene)(eta$^5$-cyclopentadienyl) iron(1+) hexafluoroantimonate |
| O-9 | (eta$^5$-cyclopentadienyl)(eta$^6$-xylene)iron(+1) hexafluoroantimonate |
| O-10 | (eta$^5$-cyclopentadienyl)(eta$^6$-pyrene)iron(+1) hexafluoroantimonate |

EPOXIDES

| | |
|---|---|
| E-1 | 3,4-epoxycyclohexylmethyl-3,4-epoxycyclohexanecarboxylate |
| E-2 | bis (3,4-epoxycyclohexylmethyl) adipate |
| E-3 | 2-(3,4-epoxycylclohexyl-5,5-spiro-3,4-epoxy) cyclohexene-meta-dioxane |
| E-4 | 2,2-bis[p-(2,3-epoxypropoxy)phenyl]-propane |

DIOLS

| | | SOURCE |
|---|---|---|
| D-1 | Carbowax™ 400 | Union Carbide Corp. |
| D-2 | Carbowax™ 1000 | Aldrich Chemical Co. |
| D-3 | Poly-G 55-28 | Olin Corp. |

FREE-RADICAL MONOMERS

| | |
|---|---|
| IOA | isooctyl acrylate |
| AA | acrylic acid |
| GA | glycidyl acrylate |

MISCELLANEOUS

| | |
|---|---|
| MEK | methylethylketone |
| HDDA | 1,6-hexanediol diacrylate |
| HEA | 2-hydroxyethyl acrylate |

EXAMPLES 1 to 10

A series of coatable compositions were prepared by partially polymerizing a mixture containing 0.04 F-1 per 100 parts IOA. The mixture was partially photopolymerized in an inert environment by irradiation with a blacklight blub having an emitting radiation in the range of 300 nm to 400 nm with a maximum at about 351 nm. A viscous prepolymer syrup was thus formed.

Next, an organometallic photoinitiator/epoxy solution was prepared by dissolving 0.5 parts O-9 per 100 parts of either E-1 or E-2 as noted. The solution was prepared by first warming the epoxy to about 60° C., then adding O-9 and stirring until O-9 was completely dissolved. These operations were done under subdued light to prevent unwanted polymerization from occurring.

Blends of the prepolymer syrup and organometallic photoinitiator\epoxy solution were prepared which contained, by weight, 80 parts prepolymer syrup 20 parts organometallic photoinitiator/epoxy solution 0.8 parts F-1, and 0 to 0.16 parts HDDA.

The components were stirred thoroughly to insure complete mixing. The prepolymer adhesive syrup was evacuated in a Binks dessicator.

Coatings were cured using two 500° watt quartz halogen lamps, a 1.8 meter bank of visible fluorescent lamps and a 1.8 meter bank of ultraviolet lamps. The coating station consisted of a 40 cm section heated to 100° C. The quartz halogen lamps were placed over this section. The coating thickness was 750 micrometers and the coating speed was 43 cm/minute. The coatings were made between poly(ethylene terephthalate) liners that were coated with a silicone release layer. The samples were postcured for 15 minutes at 100° C.

The compositions and properties of the pressure-sensitive adhesives prepared in this manner are listed in Table I.

TABLE I

| Example No. | HDDA Amount | Epoxide Type | Tensile Strength (Mpa) | Percent Elongation (%) | Peel Strength (N/mm) |
|---|---|---|---|---|---|
| 1 | 0.16 | E-1 | 1.96 | 630 | 0.49 |
| 2 | 0.08 | E-1 | 1.68 | 927 | 0.81 |
| 3 | 0.04 | E-1 | 1.24 | 1017 | 1.53 |
| 4 | 0.02 | E-1 | 0.90 | 1045 | 1.75 |
| 5 | 0.0 | E-1 | 0.63 | 1103 | 1.94 |
| 6 | 0.16 | E-2 | 3.85 | 981 | 0.58 |
| 7 | 0.08 | E-2 | 2.73 | 1295 | 0.79 |
| 8 | 0.04 | E-2 | 2.18 | 1400 | 0.96 |
| 9 | 0.02 | E-2 | 1.22 | 1400 | 1.19 |
| 10 | 0.0 | E-2 | 1.07 | 1400 | 1.72 |

These examples show how pressure-sensitive adhesives with improved cohesive and adhesive properties can be made from preferred epoxides, and preferred free-radical polymerizable monomers processed via the multiple photoinitiation system.

EXAMPLES 11 to 19 and

Comparative Examples 20C, 21C and 22C

These examples demonstrate the effect of varying the ratio of acrylate to epoxide. A series of coatable compositions were prepared by partially polymerizing mixtures of, by weight;

a) 50 to 100 parts IOA, b) 0 to 50 parts E-1 and c) 0 to 0.04 part F-1 d) 0 to 0.007 parts of O-1 in methyl ethyl ketone (MEK)

Patrial photopolymerization was carried out in an 8-ounce glass jar. The mixture was magnetically stirred while nitrogen gas was bubbled through the mixture to exclude oxygen, and the jar was loosely covered so that the escaping nitrogen gas also provided an inert atmosphere above the mixture. The mixture was purged for 5 minutes before and continually during irradiation. Then the mixture was irradiated with a blacklight fluorescent lamp. During irradiation the bulk viscosity of the mixture increased visibly and the irradiation was stopped when the viscosity appeared to reach about 1500 centipoise. A viscous pre-polymer syrup was thus formed.

Next, the syrups were processed for coating by adding, by weight;

e) 0.23 part of HDDA, f) 0 to 1.0 part of F-1 and g) 0 to 0.175 part of a saturated solution of O-1 in MEK.

The total syrup mixture was then stirred with a spatula to effect dissolution.

Viscoelastic pressure-sensitive adhesive layers were then prepared using a laboratory coater. With this coater, the sample was contained between two 15 cm wide sheets of polypropylene film coated with a release layer on the side facing the sample, to allow the sample to be removed after it was photopolymerized. The lower sheet of film supported the sample and the upper sheet caused oxygen to be excluded. The syrup was evacuated in a desiccator to remove dissolved oxygen. The prepolymer adhesive syrup was applied to the web with a conventional knife coater using an orifice of about 1 millimeter. The coater speed was 30 cm per minute. The coated sample passed through two zones. Zone 1 comprised four 300 watt flood lamps, two above the web and two below the web. zone 2 comprised six 122 cm blacklight fluorescent lamps, which absorb from about 300 nm to about 400 nm with an absorption maximum at about 351 nm, above the web and six below the web (all placed parallel to the web). After passing through the two irradiation zones the sample was postcured by heating in an oven for 15 minutes at 150° C.

Tensile strength, percent elongation, and peel adhesion strength properties of the pressure-sensitive adhesives were measured.

For comparison (20C) a syrup was prepared as in Example 11, and used to prepare a pressure-sensitive adhesive except that no cationic organometallic salt was used. A syrup was also prepared as in Example 11 and a comparative pressure-sensitive adhesive using no epoxy monomer (21C) was prepared therefrom as well as one using 2 parts by weight of acrylic acid (22C). Example 21C represents a typical homopolymer pressure-sensitive adhesive composition. Example 22C, containing acrylic acid, is a more typical conventional acrylate pressure-sensitive adhesive. This syrup was processed and coated as in Example 11, and properties of the resulting pressure-sensitive adhesive were determined.

Compositions and properties of these pressure-sensitive adhesives are listed in Table II.

TABLE II

| EXAMPLE NO. | [SYRUP COMPONENT] | | | | | Add'l F-1 | FeX[1] | Tensile str. (MPa) | Percent elongatn. (%) | Peel strength to steel (Newtons/mm) |
| --- | --- | --- | --- | --- | --- | --- | --- | --- | --- | --- |
| | IOA | E-1 | F-1 | FeX[1] | AA | | | | | |
| 11 | 50 | 50 | 0.020 | 0 | 0 | 0.50 | 20 | 0.05 | 580 | 1.70 |
| 12 | 70 | 30 | 0.028 | 0 | 0 | 0.70 | 15 | 0.22 | 282 | 1.30 |
| 13 | 80 | 20 | 0.032 | 0 | 0 | 0.80 | 10 | 0.83 | 515 | 2.12 |
| 14 | 80 | 20 | 0.032 | 0 | 0 | 0.08 | 10 | 0.81 | 645 | — |
| 15 | 80 | 20 | 0.032 | 0 | 0 | 0.00 | 10 | 0.71 | 327 | 0.35 |
| 16 | 80 | 20 | 0.000 | 1 | 0 | 0.00 | 10 | 0.16 | 1763 | — |
| 17 | 85 | 15 | 0.034 | 0 | 0 | 0.85 | 15 | 0.97 | 491 | 0.95 |
| 18 | 90 | 10 | 0.036 | 0 | 0 | 0.90 | 7 | 0.46 | 525 | 0.88 |
| 19 | 95 | 5 | 0.038 | 0 | 0 | 0.95 | 4 | 0.20 | 921 | 0.70 |
| 20C | 80 | 20 | 0.032 | 0 | 0 | 0.80 | 0 | 0.05 | 1592 | — |
| 21C | 100 | 0 | 0.040 | 0 | 0 | 1.00 | 0 | 0.28 | 825 | 0.79 |
| 22C | 100 | 0 | 0.040 | 0 | 2 | 0.05 | 0 | 0.20 | 986 | 0.98 |

[1]FeX = drops of a saturated solution of O-1 in MEK.

Results in Table II show that pressure-sensitive adhesives with IOA/E-1 ratios of 80/20 to 90/10 made using the photoinitiator system of F-1/FeX had tensile strength superior to those with 100% IOA, 21C, and an IOA/AA ratio of 98/2, 22C. Those with IOA/E-1 ratios of 50/50 to 90/10 made using this photoinitiator system had peel strength to steel comparable to or superior to that of 21C or 22C. Also Comparative Example 20C shows that a composition containing no salt of a complex organometallic cation does not have good physical properties.

EXAMPLE 23

This example demonstrates the effect of eliminating coater zone I exposure to visible light irradiation. A coatable syrup was prepared, processed for coating, and coated as described in Example 13, except that the four flood lamps in coater zone 1 were turned off so that the coated processed syrup received only ultraviolet irradiation. As the tensile and elongation data in Table II show, even with eliminating the lamps in zone 1, a material was produced with properties superior to Comparative Example 21C, containing only free-radically polymerizable homopolymer.

sample was divided into two parts, one postcured as in Examples 11–19, the other not postcured. As the tensile and elongation data in Table III show, a material can be produced with properties superior to 21C with and without the postcuring process.

TABLE III

| | [SYRUP COMPONENT] | | | | | | | | | |
|---|---|---|---|---|---|---|---|---|---|---|
| EXAMPLE NO. | IOA | E-1 | F-1 | FeX[1] | AA | Add'l F-1 | FeX[1] | Tensile str. (MPa) | Percent elongatn. (%) | Peel strength to steel (Newtons/mm) |
| 21C | 100 | 0 | 0.040 | 0 | 0 | 1.00 | 0 | 0.28 | 825 | 0.79 |
| 22C | 100 | 0 | 0.040 | 0 | 2 | 0.05 | 0 | 0.20 | 986 | 0.98 |
| 23 | 80 | 20 | 0.032 | 0 | 0 | 0.80 | 10 | 0.43 | 1228 | — |
| 24 | 80 | 20 | 0.32 | 0 | 0 | 0.80 | 10 | 0.52 | 1149 | — |
| 25 | 80 | 20 | 0.032 | 0 | 0 | 0.80 | 10 | 0.60 | 1188 | — |
| 26A[2] | 80 | 20 | 0.032 | 0 | 0 | 0.80 | 10 | 1.14 | 1081 | — |
| 26B[3] | 80 | 20 | 0.032 | 0 | 0 | 0.80 | 10 | 0.93 | 1130 | — |

[1]FeX = drops of a saturated solution of O-1 in MEK.
[2]Postcured sample
[3]NonPostcured sample

EXAMPLE 24

This example demonstrates the effect of eliminating coater zone 1 visible light irradiation and using alternating blacklight and visible light fluorescent lamps in zone 2. A coatable syrup was prepared, processed for coating, and coated as in Example 23, except using alternate blacklight and white light fluorescent lamps in zone 2. This was accomplished by replacing every other blacklight in zone 2 with a visible light fluorescent lamp. As the tensile and elongation data in Table III show, even simultaneous exposure to UV and visible light produces a material with properties superior to Comparative Example 21C, containing only free-radically polymerizable homopolymer.

EXAMPLE 25

This example demonstrates the effect of irradiating a coated processed syrup with ultraviolet light before irradiating it with substantially visible light. A coatable syrup was prepared, processed for coating, and coated as in Example 13, except that the order of irradiation was reversed; that is, the sample was irradiated first with ultraviolet radiation in zone 2 and then visible light radiation in zone 1. This was accomplished by first conducting the coating as described in Example 23. Then the coated section of the web was cut out and spliced into a new web which was then passed only through zone 1 with the lights on (the visible light zone). As the tensile and elongation data in Table III show, when the order of irradiation is reversed, i.e., ultraviolet then visible, a product can be produced with properties superior to Comparative Example 21C, containing only free-radically polymerizable homopolymer.

EXAMPLE 26

This example demonstrates the effect of the postcuring step. A syrup was prepared, processed for coating, and coated as with Example 13 described above, except that the

EXAMPLES 27 To 30

These examples demonstrate the effect of varying the concentration of organometallic complex salt. A series of coatable syrups was prepared, processed for coating, and coated as in Example 13 described above, except that the amount of the complex organometallic cation, O-1, was varied, while the amount of free-radical initiator, F-1, was held constant. The amount of O-1 used and properties of the coated and postcured adhesives are given in Table IV.

TABLE IV

| EXAMPLE NO. | FeX[1] | TENSILE STR. (MPa) | ELONGATION (%) | PEEL ADHESION TO STEEL (Newtons/mm) |
|---|---|---|---|---|
| 27 | 1 drop | 0.37 | 1576 | 0.95 |
| 28 | 3 drops | 0.59 | 1175 | 1.07 |
| 29 | 7 drops | 0.74 | 1015 | 0.58 |
| 30 | 10 drops | 0.68 | 969 | 0.54 |

[1]FeX = drops of a saturated solution of O-1 in MEK.

These examples show that pressure-sensitive adhesives having a range of properties can be produced by varying only concentration of an identical organometallic complex salt.

EXAMPLES 31 To 39

These examples demonstrate the effect of using various photoinitiator systems. A series of coatable syrups was prepared, processed for coating, and coated as in Example 13, except that various types of free-radical photoinitiators and organometallic complex salts were used while the amounts were held constant. Properties of the adhesives, all of which were postcured, are given in Table V.

TABLE V

| EXAMPLE NO. | FREE-RADICAL PHOTOINITIATOR | ORGANOMETALLIC COMPLEX SALT | TENSILE STRENGTH (MPa) | ELONGATION (%) |
|---|---|---|---|---|
| 31 | F-2 | O-1 | 0.69 | 714 |
| 32 | F-3 | O-1 | 0.26 | 928 |
| 33 | F-1 | O-2 | 0.06 | 2252 |
| 34 | F-1 | O-3 | 0.06 | 1758 |
| 35 | F-1 | O-4 | 0.13 | 1904 |
| 36 | F-1 | O-5 | 0.13 | 1990 |
| 37 | F-1 | O-6 | 0.10 | 2036 |
| 38 | F-1 | O-7 | 0.46 | 1451 |
| 39 | F-1 | O-8 | 0.88 | 508 |

These examples show that pressure-sensitive adhesives having a range of properties can be produced by varying the types of organometallic complex salt and free-radical photoinitiator used.

EXAMPLES 40 To 45

These examples demonstrate the effect of using various acrylate to epoxide ratios and various epoxies. A series of coatable syrups was prepared, processed for coating, and coated as described in Example 11 except using various ratios of IOA to various epoxides and correspondingly varying amounts of photoinitiator system components. The various epoxides are listed in the Glossary, supra. The compositions and properties of these pressure-sensitive adhesives are given in Table VI.

TABLE VI

| | [SYRUP COMPONENT] | | | | | | |
|---|---|---|---|---|---|---|---|
| EXAMPLE NO. | IOA | AMOUNT/ TYPE EPOXIDE | F-1 | ADD'L F-1 | FeX[1] | Tensile str. (MPa) | Percent elongatn. (%) |
| 40 | 70 | 30/E-2 | 0.028 | 0.70 | 15 | 1.42 | 647 |
| 41 | 80 | 20/E-2 | 0.032 | 0.80 | 10 | 1.22 | 747 |
| 42 | 85 | 15/E-2 | 0.034 | 0.85 | 15 | 0.99 | 938 |
| 43 | 90 | 10/E-2 | 0.036 | 0.90 | 7 | 0.64 | 787 |
| 44 | 95 | 5/E-2 | 0.038 | 0.95 | 4 | 0.42 | 909 |
| 45 | 80 | 20/E-3 | 0.032 | 0.80 | 10 | 0.53 | 1202 |

[1]FeX = drops of a saturated solution of O-1 in MEK.

As the data in Table VI show, pressure-sensitive adhesives having a range of properties are produced when the identity of the cationically polymerizable monomer and/or the ratio of the cationically polymerizable monomer to free-radically polymerizable monomer are varied.

EXAMPLES 46 To 53

These examples demonstrate the effect of visible light intensity and coater speed on the properties of the pressure-sensitive adhesive. Coatable syrups were prepared, processed for coating, and coated, as in Examples 13 and 41, except that the intensity of the flood lamps in coater zone 1 was varied using a rheostat, (the four lamps were plugged into an adapter of which the cord was plugged into the rheostat). The settings of the rheostat vary the light intensity, with higher values representing increased light intensity. The coater speed was also varied. Properties of the coated, post-cured adhesives are given in Table VII.

TABLE VII

| EXAMPLE NO. | EPOXIDE | VISIBLE LIGHT SOURCE SETTING | COATER SPEED (CM./MIN.) | TENSILE STR. (MPa) | ELONGATION (%) |
|---|---|---|---|---|---|
| 46 | E-1 | 60 | 15 | 0.80 | 1223 |
| 47 | E-1 | 70 | 15 | 0.85 | 1098 |
| 48 | E-1 | 80 | 15 | 1.01 | 698 |
| 49 | E-1 | 80 | 10 | 1.07 | 694 |
| 50 | E-1 | 90 | 30 | 0.93 | 1077 |
| 51 | E-2 | 80 | 5 | 2.05 | 622 |
| 52 | E-2 | 80 | 15 | 1.74 | 722 |
| 53 | E-2 | 80 | 25 | 1.32 | 807 |

These examples show that pressure-sensitive adhesives with a range of properties can be produced when one or more of the identity of the cationically polymerizable monomer, the coater speed, or visible light intensity is changed.

EXAMPLES 54 To 63

These examples demonstrate the effect on the pressure-sensitive adhesive properties when a bifunctional monomer is used. A series of coatable syrups was prepared and processed for coating as described in Example 11, except using various ratios of IOA to various epoxides, various amounts of photoinitiator system, and by weight, 0.0 to 0.2 part of GA. Viscoelastic pressure-sensitive adhesive layers were then prepared using a laboratory coater as described in Examples 11 to 19. The compositions and properties are listed in Table VIII.

TABLE VIII

| | | [SYRUP COMPONENT] | | | | | | |
|---|---|---|---|---|---|---|---|---|
| EXAMPLE NO. | IOA | AMOUNT/ TYPE EPOXIDE | F-1 | GA | ADD'L F-1 | FeX[1] | Tensile str. (MPa) | Percent elongatn. (%) |
| 54 | 70 | 30/E-1 | 0.028 | 0.14 | 0.70 | 15 | 0.88 | 550 |
| 55 | 80 | 20/E-1 | 0.032 | 0.16 | 0.80 | 10 | 0.81 | 726 |
| 56 | 85 | 15/E-1 | 0.034 | 0.17 | 0.85 | 15 | 0.79 | 801 |
| 57 | 90 | 10/E-1 | 0.036 | 0.18 | 0.90 | 7 | 0.37 | 924 |
| 58 | 95 | 5/E-1 | 0.038 | 0.19 | 0.95 | 4 | 0.12 | 753 |
| 59 | 70 | 30/E-2 | 0.028 | 0.14 | 0.70 | 15 | 1.21 | 788 |
| 60 | 80 | 20/E-2 | 0.032 | 0.16 | 0.80 | 10 | 1.23 | 855 |
| 61 | 85 | 15/E-2 | 0.034 | 0.17 | 0.85 | 15 | 0.90 | 1010 |
| 62 | 90 | 10/E-2 | 0.036 | 0.18 | 0.90 | 7 | 0.85 | 847 |
| 63 | 95 | 5/E-2 | 0.038 | 0.19 | 0.95 | 4 | 0.22 | 692 |

*FeX = drops of a saturated solution of O-1 in MEK.

These examples show that pressure-sensitive adhesives with a range of properties can be prepared when a bifunctional monomer is added to polymerizable compositions.

EXAMPLES 64 To 68

These examples demonstrate the effect on pressure-sensitive adhesive properties when a hydroxy-functional acrylate is used. A series of coatable syrups was prepared and processed for coating as described in Example 11 except using various ratios of IOA to E-1, various amounts of photoinitiator system components, and, by weight, 0 to 0.2 part of HEA. Viscoelastic pressure-sensitive adhesives were then prepared using a laboratory coater, as described in Examples 11 to 19. The compositions and their properties are listed in Table IX.

TABLE IX

| | | [SYRUP COMPONENT] | | | | | | |
|---|---|---|---|---|---|---|---|---|
| EXAMPLE NO. | IOA | E-1 | F-1 | HEA | ADD'L F-1 | FeX[1] | Tensile str. (MPa) | Percent elongatn. (%) |
| 64 | 50 | 50 | 0.020 | 0.10 | 0.50 | 20 | 0.27 | 203 |
| 65 | 60 | 40 | 0.024 | 0.12 | 0.60 | 18 | 0.88 | 783 |
| 66 | 70 | 30 | 0.028 | 0.14 | 0.70 | 15 | 0.82 | 712 |
| 67 | 80 | 20 | 0.032 | 0.16 | 0.80 | 10 | 0.58 | 925 |
| 68 | 90 | 10 | 0.036 | 0.18 | 0.90 | 7 | 0.32 | 1267 |

[1]FeX = drops of a saturated solution of O-1 in MEK.

These examples show that pressure-sensitive adhesives with a range of properties can be prepared when a bifunctional monomer is added to polymerizable compositions.

EXAMPLES 69 To 71

These examples demonstrate the effect on pressure-sensitive adhesive properties with the addition of diols to the curable composition. Coatable syrups were prepared as in Example 13, except that, by weight, 8 parts of a diol were added, and the amount of epoxide was correspondingly reduced from 20 to 12 parts. The syrups were processed for coating and coated as in Example 13. The properties of the pressure-sensitive adhesives are given in Table X.

TABLE X

| EXAMPLE NO. | DIOL | TENSILE STR. (MPa) | ELONGATION (%) | PEEL ADHESION TO STEEL (Newtons/mm) |
|---|---|---|---|---|
| 69 | D-1 | 0.70 | 1844 | 1.00 |
| 70 | D-2 | 0.30 | 1033 | — |
| 71 | D-3 | 0.43 | 1086 | 1.14 |

These examples demonstrate that pressure-sensitive adhesives with a range of properties can be produced when alcoholic functionalized materials are added to the photopolymerizable compositions of the invention.

EXAMPLES 72 To 75 and comparative Example 76C

These examples demonstrate the effect on pressure-sensitive adhesive properties with the addition of fumed silica. A series of coatable syrups was prepared, processed for coating and coated as described in Examples 11 to 19, except that to each syrup was added, by weight, 4 parts of hydrophobic fumed silica (Aerosil™ R-972, available from DeGussa). Properties of the Pressure-sensitive adhesives are listed in Table XI.

TABLE XI

| EXAMPLE NO. | [SYRUP COMPONENT] | | | | | | Tensile str. (MPa) | Percent elongatn. (%) | Peel Adhesion to steel (Newtons/mm) |
| --- | --- | --- | --- | --- | --- | --- | --- | --- | --- |
| | IOA | E-1 | F-1 | Aerosil | ADD'L F-1 | FeX[1] | | | |
| 72 | 70 | 30 | 0.028 | 4 | 0.70 | 15 | 0.57 | 274 | 0.51 |
| 73 | 80 | 20 | 0.032 | 4 | 0.80 | 10 | 0.63 | 561 | 0.98 |
| 74 | 90 | 10 | 0.036 | 4 | 0.90 | 7 | 1.03 | 982 | 1.14 |
| 75 | 95 | 5 | 0.038 | 4 | 0.95 | 4 | 0.69 | 984 | 0.95 |
| 76C | 100 | 0 | 0.040 | 4 | 1.00 | 0 | 0.50 | 769 | 1.14 |

[1]FeX = drops of a saturated solution of O-1 in MEK.

These examples demonstrate that the internal strength of pressure-sensitive adhesives increases when hydrophobic silica is added to the photopolymerizable compositions.

EXAMPLES 77 To 86

A coatable prepolymer syrup was prepared by partially polymerizing a mixture of, by weight, 100 parts of IOA and 0.04 part of F-1. Partial polymerization was carried out in a glass jar. The mixture was magnetically stirred while nitrogen gas was bubbled through the mixture to exclude oxygen, and the jar was loosely covered so that the escaping nitrogen gas also provided an inert atmosphere above the mixture. Then the mixture was irradiated with a blacklight fluorescent lamp. During irradiation the bulk viscosity of the mixture increased visibly and the irradiation was stopped when the viscosity appeared to reach about 1500 cps. A viscous prepolymer syrup was thus formed. This syrup was stabilized by bubbling air through the jar.

Next, an epoxy/organometallic photoinitiator solution was prepared which contained, by weight, 100 parts of E-1 or E-2 and 0.5 part of O-1. This solution was prepared in a glass jar, and this mixture of epoxy and organometallic photoinitiator was magnetically stirred and heated in a warm water bath to effect dissolution. The procedure was conducted in subdued light to prevent further polymerization from occurring.

Blends of the prepolymer syrup and epoxy/organometallic photoinitiator solution were prepared which contained, by weight, 50 to 100 parts of prepolymer syrup, and 0 to 50 parts of epoxy/organometallic photoinitiator solution. The blends were processed for coating by adding to 100 parts of blend, by weight, 0.23 part of HDDA, and 0 to 1.0 parts of F-1. The processed blends were stirred with a spatula to effect dissolution.

The processed blends were then coated as described above in Examples 11 to 19. The compositions and properties of the pressure-sensitive adhesives are listed in Table XII.

TABLE XII

| EXAMPLE NO. | IOA PRE-POLYMER SYRUP | EPOXIDE TYPE/ AMOUNT | TENSILE STRENGTH (MPa) | PERCENT ELONGATION (%) |
| --- | --- | --- | --- | --- |
| 77 | 50 | E-1/50 | 2.55 | 413 |
| 78 | 60 | E-1/40 | 2.92 | 561 |
| 79 | 70 | E-1/30 | 2.19 | 647 |
| 80 | 80 | E-1/20 | 2.23 | 717 |
| 81 | 90 | E-1/10 | 0.68 | 673 |
| 82 | 65 | E-2/35 | 3.30 | 541 |
| 83 | 70 | E-2/30 | 3.42 | 748 |
| 84 | 75 | E-2/25 | 3.23 | 789 |
| 85 | 80 | E-2/20 | 2.87 | 831 |
| 86 | 90 | E-2/10 | 1.50 | 873 |

These examples show that pressure-sensitive adhesives with a range of properties can be prepared when the coatable syrup is processed by dissolving the organometallic photoinitiator in the epoxide monomer and adding this solution to a prepolymer syrup prepared solely from acrylate monomer.

EXAMPLES 87 to 89

A coatable prepolymer syrup was prepared as in Examples 77 to 86. Organometallic photoinitiator/epoxy solutions were prepared by dissolving 0.5 parts of O-6, O-7 or O-10 per 100 parts E-2 using the method described in Examples 1–9. Blends of the prepolymer syrup and organometallic photoinitiator/epoxy solution were prepared according to the procedure for Examples 1 to 9 and contained, by weight, 80 parts of IOA prepolymer syrup, 20 parts of organometallic photoinitiator/epoxy solution, 0.16 parts HDDA and 0.8 parts F-1.

The compositions were then coated and cured according to the procedures used in Examples 1 to 9.

The compositions and properties of the pressure-sensitive adhesives prepared in this manner are listed in Table XIII.

TABLE XIII

| Example No. | Organo-metallic | Tensile Strength (Mpa) | Percent Elongation (%) | Peel Strength (N/mm) |
| --- | --- | --- | --- | --- |
| 87 | O-6 | 0.57 | 1500 | 0.49 |
| 88 | O-7 | 1.46 | 1185 | 0.80 |
| 89 | O-10 | 2.22 | 1023 | 0.86 |

These examples demonstrate that pressure sensitive adhesives with improved tensile strength and peel strength can be obtained using various cationic organometallics as photoinitiators.

What is claimed is:

1. A pressure-sensitive adhesive composition comprising the polymerization reaction product of starting materials comprising:

a. from about 30 parts to about 90 parts of a free-radically polymerizable component comprising at least one acrylic acid ester of a non-tertiary alcohol wherein the alkyl group of said alcohol contains from about 4 to about 14 carbon atoms;

b. from about 10 parts to about 70 parts of a cationically-polymerizable component comprising at least one epoxy compound selected from the group consisting of a 1,2-epoxide, a 1,3-epoxide and a 1,4-epoxide;

c. from about 0.01 parts to about 10 parts of at least one organometallic complex salt initiator; and d. from about 0.01 parts to about 10 parts of at least one freeradical photoinitiator;

said composition being obtained by sequential exposure to a sufficient amount of visible electromagnetic radiation to activate said organometallic complex salt and then to a sufficient amount of ultraviolet electromagnetic radiation to activate said free-radical photoinitiator; and wherein said starting materials being substantially free of an onium salt initiator.

2. A composition according to claim 1, wherein the organometallic complex salt has the following structure:

$$\{((L^1)(L^2)M)_b(L^3)(L^4)\}^{+e}X_f$$

wherein

M represents a metal atom selected from the elements of Periodic Groups IVB, VB, VIB, VIIB, and VIII; said organometallic salt having a mono- or bimetallic cation;

$L^1$ represents from zero to 3 ligands contributing pi-electrons that can be the same or different ligands selected from the group consisting of substituted and unsubstituted acyclic and cyclic unsaturated compounds and groups, substituted and unsubstituted carbocyclic aromatic and heterocyclic aromatic compounds, each capable of contributing two to twelve pi-electrons to the valence shell of M;

$L^2$ represents from zero to 3 ligands contributing an even number of sigma-electrons that can be the same or different ligands selected from the group consisting of mono-, di-, and tri- dentate ligands, each donating 2, 4, or 6 sigma-electrons to the valence shell of M;

$L^3$ represents from zero to 2 bridging ligands contributing pi-electrons that can be the same or different ligands selected from the group consisting of substituted and unsubstituted acyclic and cyclic unsaturated compounds and groups and substituted and unsubstituted carbocyclic aromatic and heterocyclic aromatic compounds, each capable of acting as a bridging ligand contributing 4 to 24 pi-electrons to the valence shells of two metal atoms M, simultaneously;

$L^4$ represents from zero to 3 bridging ligands contributing an even number of sigma-electrons that can be the same or different selected from the group consisting of mono-, di-, and tri- dentate ligands, each donating 2, 4, or 6 sigma-electrons to the valence shells of two metal atoms M, simultaneously; the total electronic charge contributed to M by the ligands $L^1$, $L^2$, $L^3$, and $L^4$ plus the product of the ionic charge on M with b results in a residual positive charge of e to the cation;

b is an integer having a value of 1 or 2;

e is an integer having a value of 1 or 2, the residual electrical charge of the cation;

X is an anion selected from organic sulfonate anions and halogen-containing complex anions of a metal or metalloid; and f is an integer selected from 1 or 2, said number being chosen such that the number of anions required will neutralize the positive charge e on the cation.

3. A composition according to claim 1, wherein the organometallic complex salt has the structure:

$$[(L^5)(L^6)M]^{+e}X_f$$

wherein

M represents a metal atom selected from the group consisting of elements of the Periodic Groups IVB, VB, VIB, VIIB, and VIII;

$L^5$ represents from zero to three ligands that can be the same or different, contributing pi-electrons selected from the group consisting of from zero to 3 ligands contributing pi-electrons that can be the same or different ligands selected from the group consisting of substituted and unsubstituted acyclic and cyclic unsaturated compounds and groups, substituted and unsubstituted carbocyclic aromatic and heterocyclic aromatic compounds, each capable of contributing two to twelve pi-electrons to the valence shell of M;

$L^6$ represents from zero to 6 ligands that can be the same or different, contributing an even number of sigma-electrons selected from the group consisting of from zero to 3 ligands contributing an even number of sigma-electrons that can be the same or different selected from the group consisting of mono-, di-, and tri- dentate ligands, each donating 2, 4, or 6 sigma-electrons to the valence shell of M; the total electronic charge contributed to M by $L^5$ and $L^6$ plus the ionic charge on M results in a residual net positive charge of e to the complex; e is an integer having a value of 1 or 2, the residual electrical charge of the cation; X is an anion selected from organic sulfonate anions and halogen-containing complex anions of a metal or metalloid; and f is an integer selected from 1 or 2, the number of anions required to neutralize the positive charge e on the cation.

4. A pressure-sensitive composition according to claim 1, wherein the organometallic complex salt has the following structure:

$$[(L^5)M]^{+e}X_f$$

wherein

M is iron;

$L^5$ represents from zero to 2 ligands that can be the same or different, contributing pi-electrons selected from zero to 3 ligands contributing pi-electrons that can be the same or different ligands selected from the group consisting of substituted and unsubstituted acyclic and cyclic unsaturated compounds and groups, substituted and unsubstituted carbocyclic aromatic and heterocyclic aromatic compounds, each capable of contributing two to twelve pi-electrons to the valence shell of M;

with the proviso that the total electronic charge contributed to M by $L^5$ plus the ionic charge on M results in a residual net positive charge of e to the complex; and e is an integer having a value of 1 or 2, the residual electrical charge of the cation; X is an anion selected from organic sulfonate anions and halogen-containing complex anions of a metal or metalloid; and f is an integer selected from 1 or 2, the number of anions required to neutralize the positive charge e on the cation.

5. A composition according to claim 1, wherein said free-radically polymerizable component further comprises a polar monomer copolymerizable with said acrylic acid ester.

6. A composition according to claim 5, wherein said polar copolymerizable monomer is selected from strongly polar and moderately polar monomers.

7. A composition according to claim 1, comprising:
(a) from about 70 parts to about 80 parts of said acrylic acid ester;
(b) from about 20 parts to about 30 parts of said epoxy compound;
(c) from about 0.01 part to about 10 parts of said organometallic complex salt; and
(d) from about 0.01 to about 10 parts of said radical photoinitiator.

8. A composition according to claim 1, comprising:
(a) from about 70 parts to about 80 parts of isooctyl acrylate;
(b) from about 20 parts to about 30 parts of bis (3,4-epoxycyclohexylmethyl) adipate;
(c) from about 0.01 part to about 10 parts of (eta$^5$-cyclopentadienyl)(eta$^6$-xylene)iron(+1)hexafluoroantimonate;
(d) from about 0.01 to about 10 parts of 2,2-dimethoxy-2-phenyl acetophenone; and
(e) from 0 to 1 part 1,6-hexanediol diacrylate.

9. A pressure-sensitive adhesive according to claim 1, further comprising a filler selected from a hydrophobic silica, microbubbles, or a pigment.

10. A process for making a pressure-sensitive adhesive comprising the steps of:
(a) providing a composition comprising:
(i) at least one acrylic acid ester of a non-tertiary alcohol wherein the alkyl group of said alcohol contains from about 4 to about 14 carbon atoms;
(ii) at least one epoxy compound selected from a 1,2-epoxide, a 1,3-epoxide, or a 1,4-epoxide;
(iii) at least one organometallic complex salt initiator; and
(iv) at least one free-radical photoinitiator;
(b) exposing said composition to a sufficient amount of visible electromagnetic radiation to activate said organometallic complex salt; and
(c) thereafter exposing the photoreaction product obtained in step (b) to a sufficient amount of ultraviolet electromagnetic radiation to activate said free-radical photoinitiator.

11. A pressure-sensitive adhesive composition comprising the polymerization reaction product of starting materials comprising:
a. a free-radically polymerizable component comprising at least one acrylic acid ester of a non-tertiary alcohol wherein the alkyl group of said alcohol contains from about 4 to about 14 carbon atoms;
b. a cationically-polymerizable component comprising at least one epoxy compound selected from the group consisting of a 1,2-epoxide, a 1,3-epoxide and a 1,4-epoxide;
c. at least one organometallic complex salt initiator; and
d. at least one free-radical photoinitiator selected from the group consisting of acetophenones, benzoin ethers, benzil ketals, α-amino ketones, aryl gyloxalates and trihalomethyl chromophore-substituted-s-triazines;
said starting materials being substantially free of an onium salt initiator.

12. A composition according to claim 11, comprising:
(a) from about 30 parts to about 90 parts of said acrylic ester;
(b) from about 10 parts to about 70 parts of said expoxy;
(c) from about 0.01 part to about 10 parts of said organometallic complex salt; and
(d) from about 0.01 to about 10 parts of said free-radical photoinitiator.

13. A composition according to claim 11, comprising:
(a) from about 70 parts to about 80 parts of said acrylic ester;
(b) from about 20 parts to about 30 parts of said epoxy;
(c) from about 0.01 part to about 10 parts of said organometallic complex salt; and
(d) from about 0.01 to about 10 parts of said free-radical photoinitiator.

14. A composition according to claim 11, wherein the organometallic complex salt has the following structure:

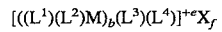

wherein

M represents a metal atom selected from the elements of Periodic Groups IVB, VB, VIB, VIIB, and VIII; said organometallic salt having a mono- or bimetallic cation;

L$^1$ represents from zero to 3 ligands contributing pi-electrons that can be the same or different ligands selected from the group consisting of substituted and unsubstituted acyclic and cyclic unsaturated compounds and groups, substituted and unsubstituted carbocyclic aromatic and heterocyclic aromatic compounds, each capable of contributing two to twelve pi-electrons to the valence shell of M;

L$^2$ represents from zero to 3 ligands contributing an even number of sigma-electrons that can be the same or different ligands selected from the group consisting of mono-, di-, and tri- dentate ligands, each donating 2, 4, or 6 sigma-electrons to the valence shell of M;

L$^3$ represents from zero to 2 bridging ligands contributing pi-electrons that can be the same or different ligands selected from the group consisting of substituted and unsubstituted acyclic and cyclic unsaturated compounds and groups and substituted and unsubstituted carbocyclic aromatic and heterocyclic aromatic compounds, each capable of acting as a bridging ligand contributing 4 to 24 pi-electrons to the valence shells of two metal atoms M, simultaneously;

L$^4$ represents from zero to 3 bridging ligands contributing an even number of sigma-electrons that can be the same or different selected from the group consisting of mono-, di-, and tri- dentate ligands, each donating 2, 4, or 6 sigma-electrons to the valence shells of two metal atoms M, simultaneously; the total electronic charge contributed to M by the ligands L$^1$, L$^2$, L$^3$, and L$^4$ plus the product of the ionic charge on M with b results in a residual positive charge of e to the cation;

b is an integer having a value of 1 or 2;

e is an integer having a value of 1 or 2, the residual electrical charge of the cation;

X is an artion selected from organic sulfonate anions and halogen-containing complex artions of a metal or metalloid; and f is an integer selected from 1 or 2, said number being chosen such that the number of anions required will neutralize the positive charge e on the cation.

15. A composition according to claim 11, wherein the organometallic complex salt has the structure:

$$[(L^5)(L^6)M]^{+e}X_f$$

wherein

M represents a metal atom selected from the group consisting of elements of the Periodic Groups IVB, VB, VIB, VIIB, and VIII;

$L^5$ represents from zero to three ligands that can be the same or different, contributing pi-electrons selected from the group consisting of from zero to 3 ligands contributing pi-electrons that can be the same or different ligands selected from the group consisting of substituted and unsubstituted acyclic and cyclic unsaturated compounds and groups, substituted and unsubstituted carbocyclic aromatic and heterocyclic aromatic compounds, each capable of contributing two to twelve pi-electrons to the valence shell of M;

$L^6$ represents from zero to 6 ligands that can be the same or different, contributing an even number of sigma-electrons selected from the group consisting of from zero to 3 ligands contributing an even number of sigma-electrons that can be the same or different selected from the group consisting of mono-, di-, and tri- dentate ligands, each donating 2, 4, or 6 sigma-electrons to the valence shell of M; the total electronic charge contributed to M by $L^5$ and $L^6$ plus the ionic charge on M results in a residual net positive charge of e to the complex; e is an integer having a value of 1 or 2, the residual electrical charge of the cation; X is an anion selected from organic sulfonate anions and halogen-containing complex anions of a metal or metalloid; and f is an integer selected from 1 or 2, the number of anions required to neutralize the positive charge e on the cation.

16. A pressure-sensitive composition according to claim 11, wherein the organometallic complex salt has the following structure:

$$[(L^5)M]^{+e}X_f$$

wherein

M is iron;

$L^5$ represents from zero to 2 ligands that can be the same or different, contributing pi-electrons selected from zero to 3 ligands contributing pi-electrons that can be the same or different ligands selected from the group consisting of substituted and unsubstituted acyclic and cyclic unsaturated compounds and groups, substituted and unsubstituted carbocyclic aromatic and heterocyclic aromatic compounds, each capable of contributing two to twelve pi-electrons to the valence shell of M;

with the proviso that the total electronic charge contributed to M by $L^5$ plus the ionic charge on M results in a residual net positive charge of e to the complex; and e is an integer having a value of 1 or 2, the residual electrical charge of the cation; X is an anion selected from organic sulfonate anions and halogen-containing complex anions of a metal or metalloid; and f is an integer selected from 1 or 2, the number of anions required to neutralize the positive charge e on the cation.

* * * * *

UNITED STATES PATENT AND TRADEMARK OFFICE
CERTIFICATE OF CORRECTION

PATENT NO. : 5,521,227  
DATED : May 28, 1996  
INVENTOR(S) : Michael C. Palazzotto, Henry B. Clark, George F. Vesley, Jerry W. Williams, and Patrick G. Zimmerman Page 1 of 4

It is certified that error appears in the above-identified patent and that said Letters Patent is hereby corrected as shown below:

Title page, Item 75 Inventors Section, replace entire section with:

--Michael C. Palazzotto, St. Paul, MN; Henry B. Clark, Roseville, MN; George F. Vesley, Hudson, WI; Jerry W. Williams, Cottage Grove, MN; Patrick G. Zimmerman, St. Paul, MN.--

On the Title page, item [54]and in
Col. 1, line 1, "CATIONCALLY" should read --CATIONICALLY--

Col. 1, line 9, "07/512921" should read --07/512,921--

Col. 3, line 16, "multiple," should read --multiple--

Col. 3, line 38, "cation,of" should read --cation of--

Col. 5, line 5, "F A Cotton" should read --F. A. Cotton--

Col. 5, line 41, "ethylene glycol" should read --ethyleneglycol--

Col. 6, line 39, "Paticularly" should read --Particularly--

Col. 7, line 10, ") polyglycidyl" should read --), polyglycidyl--

Col. 7, line 10, "of," should read --of--

Col. 7, line 21, "cyclohexaned icarboxylic" should read --cyclohexanedicarboxylic--

Col. 7, line 50, "or.6" should read --or 6--

Col. 8, line 38, "ligand, $L^5$" should read --ligand $L^5$--

Col. 8, line 44, "By "accessible" it" should read --By "accessible", it--

UNITED STATES PATENT AND TRADEMARK OFFICE
CERTIFICATE OF CORRECTION

PATENT NO. : 5,521,227  
DATED : May 28, 1996  
INVENTOR(S) : Michael C. Palazzotto, Henry B. Clark, George F. Vesley, Jerry W. Williams, and Patrick G. Zimmerman It is certified that error appears in the above-identified patent and that said Letters Patent is hereby corrected as shown below:

Col. 9, line 1, "1-octene,4-octene" should read - -1-octene, 4-octene- -

Col. 10, line 59, "$PF_6^{31}$," should read - -$PF_6^-$,- -

Col. 10, line 60, "$SnCl_5^{31}$, $SbF_5^{31}$," should read - -$SnCl_5^-$, $SbF_5^-$,- -

Col. 10, line 61, "$SbF_5\_OH^-$," should read - -$SbF_5OH^-$,- -

Col. 11, line 4, "9,851," should read - -109,851,- -

Col. 11, line 13, "is none, M is $L^6$ Fe," should read - -$L^6$ is none, M is Fe,- -

Col. 11, line 54, "photoinitiat or" should read - -photoinitiator- -

Col. 11, line 60, "Initiators" George" should read - -Initiators", George- -

Col. 12, line 11, ", $SO_2N$—Halkyl," should read - -, —$SO_2N$—Halkyl,- -

Col. 12, line 61, "diphenethyl oxy" should read - -diphenethyloxy- -

Col. 12, line 67, insert - -AX            IV- - after "formula"

Col. 13, line 8, ";, and" should read - -; and- -

Col. 13, line 10, "$SbF5OH^-$," should read - -$SbF_5OH^-$,- -

Col. 13, line 60, "compositions," should read - -compositions.- -

Col. 13, line 61, "use" should read - -Use- -

Col. 14, line 10, "like, when" should read - -like. When- -

UNITED STATES PATENT AND TRADEMARK OFFICE
CERTIFICATE OF CORRECTION

Page 3 of 4

PATENT NO. : 5,521,227
DATED : May 28, 1996
INVENTOR(S) : Michael C. Palazzotto, Henry B. Clark, George F. Vesley, Jerry W. Williams, and Patrick G. Zimmerman It is certified that error appears in the above-identified patent and that said Letters Patent is hereby corrected as shown below:

Col. 14, line 31, "peel. strength" should read --peel strength--

Col. 14, line 58, "yushi" should read --Yushi--

Col. 15, line 1, "are, incorporated" should read --are incorporated--

Col. 16, line 4, "pressure-Sensitive" should read --pressure-sensitive--

Col. 18, line 28, "out,in" should read --out in--

Col. 18, line 49, "of, superimposed" should read --of superimposed--

Col. 20, line 21, "C.," should read --C,--

Col. 20, line 36, "500°" should read --500--

Col. 21, line 14, "Patrial" should read --Partial--

Col. 21, line 66, "web. zone" should read --web. Zone--

Col. 23, line 51, "was, cut" should read --was cut--

Col. 28, line 54, "comparative" should read --Comparative--

Col. 31, line 17, "freeradical" should read --free-radical--

Col. 35, line 1, "artion" should read --anion--

UNITED STATES PATENT AND TRADEMARK OFFICE
CERTIFICATE OF CORRECTION

PATENT NO. : 5,521,227
DATED : May 28, 1996
INVENTOR(S) : Michael C. Palazzotto, Henry B. Clark, George F. Vesley, Jerry W. Williams, and Patrick G. Zimmerman It is certified that error appears in the above-identified patent and that said Letters Patent is hereby corrected as shown below:

Col. 35, line 2, "artions" should read - -anions- -

Signed and Sealed this

Seventeenth Day of February, 1998

Attest:

BRUCE LEHMAN

*Attesting Officer*  *Commissioner of Patents and Trademarks*